United States Patent
Wu et al.

(10) Patent No.: US 12,489,550 B2
(45) Date of Patent: Dec. 2, 2025

(54) ENHANCED BIT MAPPING AND ENCODING SCHEMES

(71) Applicant: QUALCOMM Incorporated, San Diego, CA (US)

(72) Inventors: Kanke Wu, San Diego, CA (US);
Jialing Li Chen, San Diego, CA (US);
Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/062,559

(22) Filed: Dec. 6, 2022

(65) Prior Publication Data

US 2024/0187131 A1    Jun. 6, 2024

(51) Int. Cl.
*H04L 1/20* (2006.01)
*H04L 1/00* (2006.01)

(52) U.S. Cl.
CPC ............ *H04L 1/0042* (2013.01); *H04L 1/203* (2013.01)

(58) Field of Classification Search
CPC ..... H04L 1/0042; H04L 1/203; H04L 1/0065; H04L 1/0066; H04L 1/007; H04L 1/0057
See application file for complete search history.

(56) References Cited

U.S. PATENT DOCUMENTS

| | | | | |
|---|---|---|---|---|
| 7,154,936 B2* | 12/2006 | Bjerke | ................. | H04L 1/0059 375/150 |
| 7,372,896 B2* | 5/2008 | Bjerke | ................. | H04L 1/005 375/150 |
| 7,684,510 B2* | 3/2010 | Lee | ................. | H03M 13/25 375/267 |
| 7,831,883 B2* | 11/2010 | Tong | ................. | H03M 13/27 714/752 |
| 8,032,800 B2* | 10/2011 | Pons | ................. | H03M 13/6362 370/464 |
| 8,457,219 B2* | 6/2013 | Pons | ................. | H03M 13/1102 714/758 |
| 9,319,114 B2* | 4/2016 | Ling | ................. | H04L 1/005 |
| 9,647,733 B2* | 5/2017 | Ling | ................. | H04L 1/0068 |

(Continued)

FOREIGN PATENT DOCUMENTS

WO    2006006833 A1    1/2006
WO    2021046739 A1    3/2021

OTHER PUBLICATIONS

International Search Report and Written Opinion—PCT/US2023/078996—ISA/EPO—Feb. 23, 2024.

*Primary Examiner* — Jay P Patel
(74) *Attorney, Agent, or Firm* — Holland & Hart LLP

(57) ABSTRACT

Methods, systems, and devices for wireless communication are described. An encoding device may obtain a first set of coded bits by encoding multiple sets of information bits in accordance with a parallel encoding scheme. The encoding device may obtain a second set of coded bits by using some or all of the first set of coded bits to encode a second set of information bits in accordance with a concatenated encoding scheme. The encoding device may map at least the second set of coded bits to different layers of a constellation based on a first priority associated with the first set of coded bits and a second priority associated with the second set of coded bits. Accordingly, the encoding device may transmit a signal associated with the second set of coded bits based on modulating the signal in accordance with the mapping.

30 Claims, 10 Drawing Sheets

(56) References Cited

U.S. PATENT DOCUMENTS

| | | | |
|---|---|---|---|
| 9,762,360 B2* | 9/2017 | Limberg | H04N 21/2383 |
| 9,979,580 B2* | 5/2018 | Ling | H04L 1/0066 |
| 10,778,366 B2* | 9/2020 | Loncke | H04L 1/0057 |
| 2006/0212774 A1* | 9/2006 | Lee | H04L 1/0066 |
| | | | 714/755 |
| 2007/0153838 A1* | 7/2007 | Pons | H03M 13/31 |
| | | | 370/529 |
| 2007/0157065 A1* | 7/2007 | Pons | H03M 13/31 |
| | | | 714/800 |
| 2009/0083604 A1* | 3/2009 | Tong | H03M 13/1148 |
| | | | 714/752 |
| 2010/0241923 A1* | 9/2010 | Wang | H03M 13/253 |
| | | | 714/755 |
| 2012/0204083 A1* | 8/2012 | Miyazaki | H03M 13/2957 |
| | | | 714/801 |
| 2016/0043784 A1* | 2/2016 | Ling | H04L 27/3488 |
| | | | 375/267 |
| 2017/0244588 A1* | 8/2017 | Ling | H04L 1/005 |
| 2018/0294917 A1* | 10/2018 | Loncke | H04L 1/0013 |

* cited by examiner

ENHANCED BIT MAPPING AND ENCODING SCHEMES

TECHNICAL FIELD

This disclosure relates generally to wireless communication, and more specifically, to enhanced bit mapping and encoding schemes.

DESCRIPTION OF THE RELATED TECHNOLOGY

A wireless local area network (WLAN) may be formed by one or more wireless communication devices, such as access points (APs) that provide a shared wireless communication medium for use by multiple client devices, which may also be referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A WLAN may support a number of different forward error correction (FEC) schemes, some of which may involve low density parity check (LDPC) encoding. In some cases, however, these FEC schemes may not account for factors like reliability or priority.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a wireless device. The method may include obtaining two or more sets of systematic bits and two or more sets of parity bits based on encoding a first set of information bits in parallel with at least one other set of information bits, where encoding the first set of information bits results in a first set of systematic bits and a first set of parity bits. The method may further include obtaining a second set of systematic bits and a second set of parity bits based on using one or both of the first set of systematic bits and the first set of parity bits to encode a second set of information bits in accordance with a concatenated encoding scheme. The method may further include mapping at least the second set of systematic bits and the second set of parity bits to at least two layers of a constellation based on a first priority of the first set of information bits and a second priority of the second set of information bits, where different sets of bits of the at least the second set of systematic bits and the second set of parity bits are mapped to different layers of the at least two layers of the constellation. The method may further include transmitting a signal associated with the second set of systematic bits and the second set of parity bits based on modulating the signal in accordance with the mapping.

Another innovative aspect of the subject matter described in this disclosure can be implemented in an apparatus for wireless communication at a wireless device. The apparatus may include a processor, memory coupled with the processor, and instructions stored in the memory. The instructions may be executable by the processor to cause the apparatus to obtain two or more sets of systematic bits and two or more sets of parity bits based on encoding a first set of information bits in parallel with at least one other set of information bits, where encoding the first set of information bits results in a first set of systematic bits and a first set of parity bits. The instructions may be further executable by the processor to cause the apparatus to obtain a second set of systematic bits and a second set of parity bits based on using one or both of the first set of systematic bits and the first set of parity bits to encode a second set of information bits in accordance with a concatenated encoding scheme. The instructions may be further executable by the processor to cause the apparatus to map at least the second set of systematic bits and the second set of parity bits to at least two layers of a constellation based on a first priority of the first set of information bits and a second priority of the second set of information bits, where different sets of bits of the at least the second set of systematic bits and the second set of parity bits are mapped to different layers of the at least two layers of the constellation. The instructions may be further executable by the processor to cause the apparatus to transmit a signal associated with the second set of systematic bits and the second set of parity bits based on modulating the signal in accordance with the mapping.

Another innovative aspect of the subject matter described in this disclosure can be implemented in an apparatus for wireless communication at a wireless device. The apparatus may include means for obtaining two or more sets of systematic bits and two or more sets of parity bits based on encoding a first set of information bits in parallel with at least one other set of information bits, where encoding the first set of information bits results in a first set of systematic bits and a first set of parity bits. The apparatus may further include means for obtaining a second set of systematic bits and a second set of parity bits based on using one or both of the first set of systematic bits and the first set of parity bits to encode a second set of information bits in accordance with a concatenated encoding scheme. The apparatus may further include means for mapping at least the second set of systematic bits and the second set of parity bits to at least two layers of a constellation based on a first priority of the first set of information bits and a second priority of the second set of information bits, where different sets of bits of the at least the second set of systematic bits and the second set of parity bits are mapped to different layers of the at least two layers of the constellation. The apparatus may further include means for transmitting a signal associated with the second set of systematic bits and the second set of parity bits based on modulating the signal in accordance with the mapping.

Another innovative aspect of the subject matter described in this disclosure can be implemented in a non-transitory computer-readable medium storing code for wireless communication at a wireless device. The code may include instructions executable by a processor to obtain two or more sets of systematic bits and two or more sets of parity bits based on encoding a first set of information bits in parallel with at least one other set of information bits, where encoding the first set of information bits results in a first set of systematic bits and a first set of parity bits. The instructions may be further executable by the processor to obtain a second set of systematic bits and a second set of parity bits based on using one or both of the first set of systematic bits and the first set of parity bits to encode a second set of information bits in accordance with a concatenated encoding scheme. The instructions may be further executable by the processor to map at least the second set of systematic bits and the second set of parity bits to at least two layers of a constellation based on a first priority of the first set of information bits and a second priority of the second set of information bits, where different sets of bits of the at least the second set of systematic bits and the second set of parity bits are mapped to different layers of the at least two layers of the constellation. The instructions may be further executable by the processor to transmit a signal associated with the second set of systematic bits and the second set of parity bits based on modulating the signal in accordance with the mapping.

Some implementations of the methods, apparatuses, and non-transitory computer-readable media described herein may further include operations, features, means, or instructions for mapping the second set of systematic bits and the second set of parity bits to the at least two layers of the constellation based on a reliability of each of the at least two layers.

Some implementations of the methods, apparatuses, and non-transitory computer-readable media described herein may further include operations, features, means, or instructions for mapping the second set of systematic bits and the second set of parity bits to the at least two layers of the constellation based on a bit error rate (BER) associated with a wireless communication channel between the wireless device and a second wireless device, a signal-to-noise ratio (SNR) associated with the wireless communication channel between the wireless device and the second wireless device, or both.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
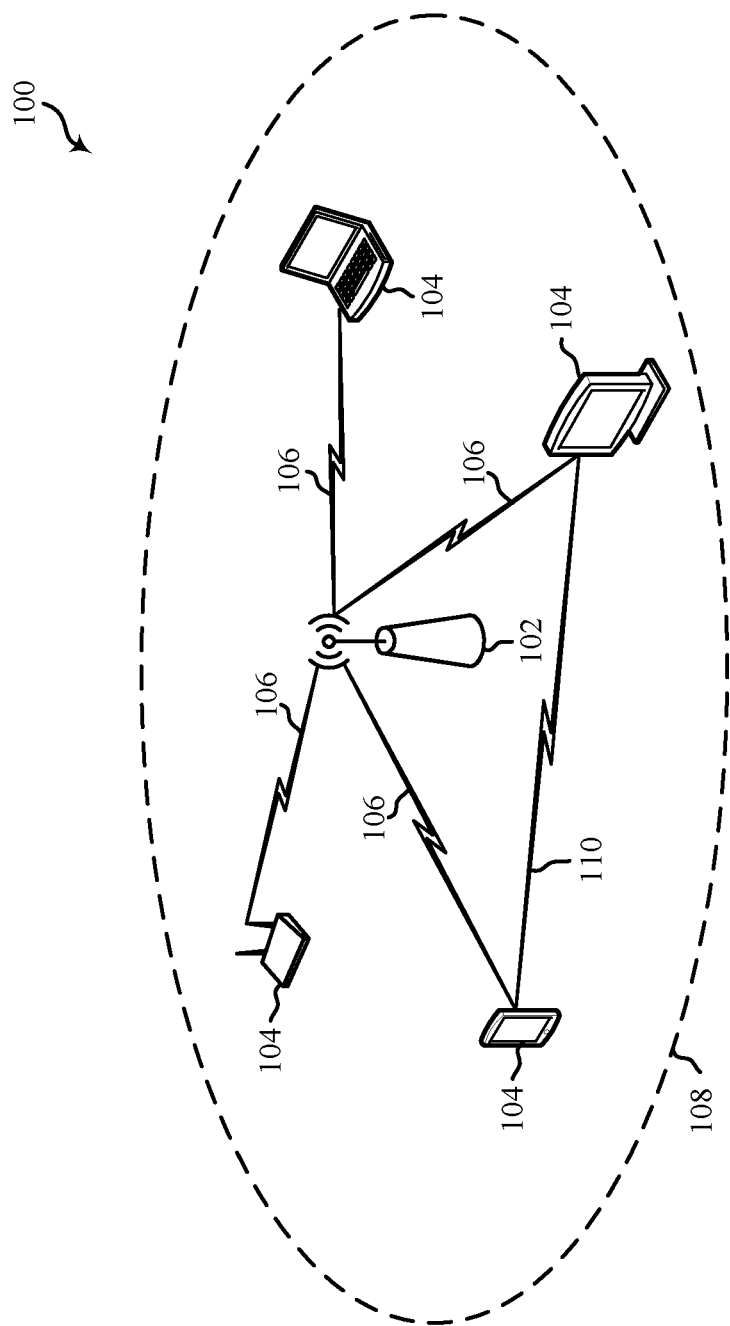
FIG. 1 shows a pictorial diagram of an example wireless local area network (WLAN).

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the third Generation Partnership Project (3GPP), among others.

The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

A wireless device, such as an access point (AP) or a station (STA), may encode information bits (e.g., data) using a forward error correction (FEC) scheme to improve the likelihood of the information bits being successfully received by other wireless devices. The wireless device may use a parallel encoding scheme or a concatenated encoding scheme to encode the information bits. In a parallel encoding scheme, different sets of information bits may be separately (e.g., independently) encoded by respective FEC encoders, such as low density parity check (LDPC) encoders. In a concatenated encoding scheme, the output of one FEC encoder may be used as an input to another FEC encoder. As such, the output of one FEC encoder may depend on the output of one or more preceding FEC encoders.

Once the information bits are encoded, the wireless device may assign or map the encoded information bits to positions (also referred to as coordinates or points) in a constellation. As used herein, the term constellation refers to a grid or graph with axes corresponding to an in-phase (I) component of a signal and a quadrature (Q) component of the signal. The magnitude or distance between a given position and the origin (center) of the constellation may correspond to the amplitude of the signal. Different positions in the constellation may have different associated bit values. In some aspects, each bit value may be associated with multiple layers, where different layers of a bit value may be associated with different reliabilities and may correspond to different bit positions of the bit value. For example, a bit value of $B_0B_1B_2B_3$ may be divided into a first bit layer of $B_0B_2$ and a second bit layer of $B_1B_3$, where the first layer may be associated with a higher reliability than the second layer. As such, if different subsets of the information bits are associated with different priorities, the wireless device may assign relatively higher priority information bits to bit positions that correspond to the first bit layer (e.g., $B_0B_2$) and may assign relatively lower priority information bits to bit positions that correspond to the second bit layer (e.g., $B_1B_3$).

In a parallel encoding scheme, different bit layers may be independently encoded and mapped to different constellation layers (positions associated with similar reliabilities). In a concatenated encoding scheme, the output of an FEC encoder for a relatively higher priority bit stream may be used as an input to an FEC encoder for a relatively lower priority bit stream, thereby increasing the reliability of information bits from the high priority bit stream. In some cases, however, parallel and concatenated encoding schemes may result in relatively high rate loss and sub-optimal performance.

Various aspects relate generally to combined encoding schemes that leverage aspects of parallel and concatenated encoding in a way that results in lower overall rate loss and greater reliability. Some of the encoding schemes described herein utilize cascaded concatenation layers, while others utilize non-cascaded concatenation layers. Cascading may refer to an iterative process of using an output from a first FEC encoder as an input to a second FEC encoder, using the output from the second FEC encoder as an input to a third FEC encoder, and so on. In non-cascaded encoding schemes, the inputs of different FEC encoders may be largely independent of each other. In both types of combined encoding schemes described herein (cascaded and non-cascaded), parallel encoding techniques may be used for some layers (for example, bit streams with lower signal-to-noise ratio (SNR) constraints), while concatenated encoding techniques may be used for other layers. Unlike other encoding schemes, the input of a given layer may exclude parity bits from previous layers, thereby reducing the overall rate loss associated with the encoding process.

As an example, an encoding device may obtain a first set of systematic bits and parity bits by encoding multiple sets of information bits in accordance with a parallel encoding scheme. The encoding device may obtain a second set of systematic bits and parity bits by using some or all of the first set of systematic bits and parity bits to encode a second set of information bits in accordance with a concatenated encoding scheme. The encoding device may map at least the second set of systematic bits and parity bits to different layers of a constellation based on a first priority associated with the first set of systematic bits and parity bits and a second priority associated with the second set of systematic bits and parity bits. Accordingly, the encoding device may transmit a signal associated with the second set of systematic bits and parity bits based on modulating the signal in accordance with the mapping.

Particular aspects of the subject matter described in this disclosure can be implemented to realize one or more of the following potential advantages. The combined encoding and mapping schemes disclosed herein may improve the likelihood of a decoding device successfully receiving and decoding information from an encoding device. For example, the bit mapping schemes described herein may enable the encoding device to allocate higher priority bits to more reliable layers of a constellation, thereby improving the likelihood of the higher priority bits being successfully received. Moreover, using combined encoding schemes that leverage aspects of parallel coding and concatenated coding may result in lower rate loss, higher signal quality, fewer decoding errors, etc.

FIG. 1 shows a pictorial diagram of an example WLAN 100. According to some aspects, the WLAN 100 can be an example of a Wi-Fi network. For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8).

The WLAN 100 may include numerous wireless communication devices such as a wireless access point (AP) 102 and multiple wireless stations (STAs) 104. While one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad-hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY PDUs (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHZ or 6 GHZ bands, each of which is divided into multiple 20 MHz channels. As such, these PPDUs are transmitted over a physical channel having a minimum bandwidth of 20 MHZ, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Transmitting and receiving devices may support the use of various modulation and coding schemes (MCSs) to transmit and receive data so as to optimally take advantage of wireless channel conditions, for example, to increase throughput, reduce latency, or enforce various quality of service (QOS) parameters. For example, existing technology supports the use of up to 1024-QAM, where a modulated symbol carries 10 bits. To further improve peak data rate, 4096-QAM (also referred to as "4k QAM"), which enables a modulated symbol to carry 12 bits, also may be implemented. 4096-QAM may enable a 20% increase in data rate compared to 1024-QAM given the same coding rate, thereby allowing users to obtain higher transmission efficiency.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with an FEC code, such as an LDPC coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (for example, a NACK that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

QAM is one of many modulation schemes that involve a combination of phase modulation and amplitude modulation. QAM represents bits as points in a constellation (also referred to as a constellation map or a quadrant grid), which includes a graph of the phase and amplitude modulation points in a given modulation scheme. In accordance with aspects of the present disclosure, a wireless device (such as an AP 102 or a STA 104) may encode and map bits to different layers of a constellation. For modulation schemes like binary phase shift keying (BPSK) and quadrature phase shift keying (QPSK), each layer of the constellation may include one or two bits. For example, a BPSK constellation may include one 1-bit layer. QPSK can be considered as two orthogonal (I/Q) BPSK, with an equal power split.

For QPSK, a received signal may be represented by the following equation:

$$y = x + n = \left(\frac{1}{\sqrt{2}}x_1 + \frac{1}{\sqrt{2}}jx_2\right) + \left(\frac{1}{\sqrt{2}}n_1 + \frac{1}{\sqrt{2}}jn_2\right), \text{ where } x_1,$$

$$x_2, n_1, n_2 \in R, E|x|^2 = E|x_1|^2 = E|x_2|^2 = 1, E|n|^2 = E|n_1|^2 =$$

$$E|n_2|^2 = \sigma_n^2 \text{ and } SNR_{QPSK,B_0B_1} = SNR_{BPSK,B_0} = SNR_{BPSK,B_1} = \frac{1}{\sigma_n^2}.$$

With the same code rate, BPSK modulation may provide a 3 dB gain over QPSK modulation. For BPSK, a received signal can be represented by the following equation:

$$y = x + n = x + \left(\frac{1}{\sqrt{2}}n_1 + \frac{1}{\sqrt{2}}jn_2\right), \text{ where } x, n_1, n_2 \in R,$$

-continued $$E|x|^2 = 1, E|n|^2 = E|n_1|^2 = E|n_2|^2 = \sigma_n^2 \text{ and } SNR_{BPSK,B_0} = \frac{2}{\sigma_n^2}.$$

In some aspects, a first MCS (BPSK, ½) may have a 3 dB gain over a second MCS (QPSK, ½) in additive white Gaussian noise (AWGN). Two 1-bit in-phase/quadrature (I/Q) layers (for example, BPSK) may have the same reliability as one 2-bit layer (for example, QPSK), because in QPSK, both signal power and interference plus noise power may be split into I/Q channels.

A QAM constellation shape for QPSK and above may take a 2-bit layer (for example, an in-phase (I) component and a quadrature (Q) component with same reliability) as a basic unit. The 1-bit layers and 2-bit layers may have the same SNR threshold for a target packet error rate (PER) or bit error rate (BER), even though splitting a constellation into 1-bit layers may provide more rate steps for dividing the data rate. For example, in unencoded 1024-QAM, every two bits (I/Q orthogonal) may have the same BER performance. Therefore, an M-QAM could be split into at most log 2(M)/2 2-bit layers or up to log 2(M)/2-1 layers with mixture of 2/4/6/8/10-bit layers A 16-QAM constellation may include two 2-bit layers and may be associated with bit values defined by $B_0B_1B_2B_3$. Each I/Q component in 16-QAM constellation points may take a value from $[-3:2:3]/\sqrt{10}$. The 16-QAM constellation may be divided into two 2-bit layers. The most reliable layer (for example, the first layer $B_0B_2$) may include QPSK points with a larger power allocation. Each constellation point may take a value from $2/\sqrt{10}(\pm 1 \pm j)$, with a power allocation of ⅘. The less reliable layer (for example, the second layer, $B_1B_3$) may be centered at a constellation point of $B_1B_3$ with a smaller power allocation. Each constellation point may take a value from $1/\sqrt{10}(\pm 1 \pm j)$, with a power allocation of ⅕. Between two consecutive 2-bit layers, the power allocation ratio may be 4:1 in all forms of QAM. The power of a 16-QAM signal (for example, a signal modulated using 16-QAM) may be represented by the following equation:

$$x = \frac{2}{\sqrt{5}}x_1 + \frac{1}{\sqrt{5}}x_2,$$

where $x_1$ and $x_2$ are QPSK signals (each of a unit power).

A 64-QAM constellation may include three 2-bit layers and may be associated with bit values defined by $B_0B_1B_2B_3B_4B_5$. The first layer ($B_0B_3$) may include QPSK points at $$\frac{4}{\sqrt{42}}(\pm 1 \pm j),$$

with a power allocation of $$\frac{16}{21}.$$

The second layer ($B_1B_4$) may include QPSK points at $$\frac{2}{\sqrt{42}}(\pm 1 \pm j)$$

centered at constellation point of $B_0B_3$, with a power allocation of $$\frac{4}{21}.$$

The third layer ($B_2B_5$) may include QPSK points at $$\frac{1}{\sqrt{42}}(\pm 1 \pm j),$$

centered at a constellation point of $B_0B_1B_3B_4$, with a power allocation of $$\frac{1}{21}.$$

The power of a 64-QAM signal may be represented by the following equation:

$$x = \frac{4}{\sqrt{21}}x_1 + \frac{2}{\sqrt{21}}x_2 + \frac{1}{\sqrt{21}}x_3,$$

where $x_1$, $x_2$, $x_3$ denote the power of different QPSK signals.

A 256-QAM constellation may be divided into four 2-bit layers and may be associated with bit values defined by $B_0B_1B_2B_3B_4B_5B_6B_7$, ranging from most to least reliable (first to fourth) layers $B_0B_4/B_1B_5/B_2B_6/B_3B_7$, where QPSK signals (centered at a constellation point from previous layer(s), if any) have power allocations of $$\left[\frac{64}{85}, \frac{16}{85}, \frac{4}{85}, \frac{1}{85}\right],$$

respectively.

A 1024-QAM constellation may be divided into five 2-bit layers and may be associated with bit values defined by $B_0B_1B_2B_3B_4B_5B_6B_7B_8B_9$, ranging from the most to least reliable (first to fifth) layers $B_0B_5/B_1B_6/B_2B_7/B_3B_8/B_4B_9$, where QPSK signals (centered at a constellation point from previous layer(s) if any) have power allocations of $$\left[\frac{256}{341}, \frac{64}{341}, \frac{16}{341}, \frac{4}{341}, \frac{1}{341}\right],$$

respectively.

A 4096-QAM constellation may be divided into six 2-bit layers and may be associated with bit values defined by $B_0B_1B_2B_3B_4B_5B_6B_7B_8B_9B_{10}B_{11}$, ranging from the most to least reliable (first to sixth) layers $B_0B_6/B_1B_7/B_2B_8/B_3B_9/B_4B_{10}/B_5B_{11}$, where QPSK signals (centered at a constellation point from previous layer(s) if any) have power allocations of $$\left[\frac{1024}{1365}, \frac{256}{1365}, \frac{64}{1365}, \frac{16}{1365}, \frac{4}{1365}, \frac{1}{1365}\right],$$

respectively.

In general terms, an M-QAM constellation may be split into log 2(M)/2 2-bit layers (using QPSK for each layer). From the most to least reliable (first to log 2(M)/2-th) layers: QPSK signals (centered at a constellation point from previous layer(s), if any) may have power allocations of $$\frac{4^{\left[\frac{\log_2 M}{2} - 1:-1:0\right]}}{\text{sum}\left(4^{\left[\frac{\log_2 M}{2} - 1:-1:0\right]}\right)}$$

for each layer, and increasing SNR thresholds (for example, target SNRs). Between two consecutive 2-bit layers, the power of the more reliable layer may be 6 dB higher than the power of the less reliable layer. An M-QAM constellation could be also split from 2 layers to log 2(M)/2-1 layers with mixture of 2/4/6/8/10-bit layers. A 4/6/8/10-bit layer (using 16/64/256/1024-QAM) may be formed by two/three/four/five consecutive 2-bit layers, with power allocations equal to the sum of power of these two/three/four/five 2-bit layers.

A 64-QAM constellation may be divided into layers using several different approaches, including:
  Option 1: Divide the 64-QAM constellation into three 2-bit layers
  Option 2: Divide the 64-QAM constellation into two layers
  Option 2a: Include 2 bits in the first layer and 4 bits in the second layer. The first layer ($B_0B_3$) may be the same as the first layer in the 3-layer setting, whereas the second layer ($B_1B_2B_4B_5$) may include 16-QAM points (centered at a constellation point of $B_0B_3$), with a power allocation of $$\frac{5}{21}.$$

The power of a 64-QAM signal may be represented by the following equation:

$$x = \frac{4}{\sqrt{21}}x_1 + \frac{\sqrt{5}}{\sqrt{21}}x_2,$$

where $x_1$ is the power of a QPSK signal and $x_2$ is the power of a 16-QAM signal.
  Option 2b: Include 4 bits in the first layer and 2 bits in the second layer. The first layer ($B_0B_1B_3B_4$) may include 16-QAM points with a power allocation of $$\frac{20}{21}.$$

The second layer ($B_2B_5$) may be the same as the third layer in the 3-layer setting. The power of a 64-QAM signal may be represented by the following equation:

$$x = \frac{2\sqrt{5}}{\sqrt{21}}x_1 + \frac{1}{\sqrt{21}}x_2,$$

where $x_1$ is the power of a 16-QAM signal and $x_2$ is the power of a QPSK signal.

For higher order QAM schemes, there may be different ways to form different numbers of layers with different numbers of bits. For example, there may be different approaches for dividing a 256-QAM constellation into multiple layers, such as:

Option 1: Divide the 256-QAM constellation into four 2-bit layers. From the most to least reliable (first to fourth) layers ($B_0B_4/B_1B_5/B_2B_6/B_3B_7$), QPSK signals (centered at a constellation point from previous layer(s), if any) may have power allocations of $$\left[\frac{64}{85}, \frac{16}{85}, \frac{4}{85}, \frac{1}{85}\right],$$

respectively.

Option 2: Divide the 256-QAM constellation into three layers.

Option 2a: Include 2 bits ($B_0B_4$, QPSK) in the first layer, 2 bits ($B_1B_5$, QPSK) in the second layer, and 4 bits ($B_2B_3B_6B_7$, 16-QAM) in the third layer, with power allocations of $$\left[\frac{64}{85}, \frac{16}{85}, \frac{5}{85}\right],$$

respectively.

Option 2b: Include 2 bits ($B_0B_4$, QPSK) in the first layer, 4 bits ($B_1B_2B_5B_6$, 16-QAM) in second layer, and 2 bits ($B_3B_7$, QPSK) in the third layer, with power allocations of $$\left[\frac{64}{85}, \frac{20}{85}, \frac{5}{85}\right],$$

respectively.

Option 2c: Include 4 bits ($B_0B_1B_4B_5$, 16-QAM) in the first layer, 2 bits ($B_2B_6$, QPSK) in second layer, and 2 bits ($B_3B_7$, QPSK) in the third layer, with power allocations of $$\left[\frac{80}{85}, \frac{16}{85}, \frac{5}{85}\right],$$

respectively.

Option 3: Divide the 256-QAM constellation into two layers.

Option 3a: Include 2 bits ($B_0B_4$, QPSK) in the first layer and 6 bits ($B_1B_2B_3B_5B_6B_7$, 64-QAM) in the second layer, with power allocations of $$\left[\frac{64}{85}, \frac{21}{85}\right],$$

respectively.

Option 3b: Include 4 bits ($B_0B_1B_4B_5$, 16-QAM) in the first layer and 4 bits ($B_2B_3B_6B_7$, 16-QAM) in the second layer, with power allocations of $$\left[\frac{80}{85}, \frac{5}{85}\right],$$

respectively.

Option 3c: Include 6 bits ($B_0B_1B_2B_4B_5B_6$, 64-QAM) in the first layer and 2 bits ($B_3B_7$, QPSK) in the second layer, with power allocations of $$\left[\frac{84}{85}, \frac{1}{85}\right],$$

respectively.

Several approaches can be used to divide a 1024-QAM constellation into layers, including:

Option 1: Divide the 124-QAM constellation into five 2-bit layers. From the most to least reliable (first to fifth) layers ($B_0B_5/B_1B_6/B_2B_7/B_3B_8/B_4B_9$): QPSK signals (centered at a constellation point from previous layer(s), if any) may have power allocations of $$\left[\frac{256}{341}, \frac{64}{341}, \frac{16}{341}, \frac{4}{341}, \frac{1}{341}\right],$$

respectively.

Option 2: Divide the 1024-QAM constellation into four layers.

Option 2a: Include 2 bits ($B_0B_5$, QPSK) in the first layer, 2 bits ($B_1B_6$, QPSK) in the second layer, 2 bits ($B_2B_7$, QPSK) in the third layer, and 4 bits ($B_3B_4B_8B_9$, 16-QAM) in the fourth layer, with power allocations of $$\left[\frac{256}{341}, \frac{64}{341}, \frac{16}{341}, \frac{5}{341}\right],$$

respectively.

Option 2b: Include 2 bits ($B_0B_5$, QPSK) in the first layer, 2 bits ($B_1B_6$, QPSK) in the second layer, 4 bits ($B_2B_3B_7B_8$, 16-QAM) in third layer, and 2 bits ($B_4B_9$, QPSK) in the fourth layer, with power allocations of $$\left[\frac{256}{341}, \frac{64}{341}, \frac{20}{341}, \frac{1}{341}\right],$$

respectively.

Option 2c: Include 2 bits ($B_0B_5$, QPSK) in the first layer, 4 bits ($B_1B_2B_6B_7$, 16-QAM) in the second layer, 2 bits ($B_3B_8$, QPSK) in the third layer, and 2 bits ($B_4B_9$, QPSK) in the fourth layer, with power allocations of $$\left[\frac{256}{341}, \frac{80}{341}, \frac{4}{341}, \frac{1}{341}\right],$$

respectively.

Option 2d: Include 4 bits ($B_0B_1B_5B_6$, 16-QAM) in the first layer, 2 bits ($B_2B_7$, QPSK) in the second layer, 2 bits ($B_3B_8$, QPSK) in the third layer, and 2 bits ($B_4B_9$, QPSK) in the fourth layer, with power allocations of $$\left[\frac{320}{341}, \frac{16}{341}, \frac{4}{341}, \frac{1}{341}\right],$$

respectively.

Option 3: Divide the 1024-QAM constellation into three layers.

Option 3a: Include 2 bits ($B_0B_5$, QPSK) in the first layer, 2 bits ($B_1B_6$, QPSK) in the second layer, and 6 bits ($B_2B_3B_4B_7B_8B_9$, 64-QAM) in the third layer, with power allocations of $$\left[\frac{256}{341}, \frac{64}{341}, \frac{21}{341}\right],$$

respectively.

Option 3b: Include 2 bits ($B_0B_5$, QPSK) in the first layer, 6 bits ($B_1B_2B_3B_6B_7B_8$, 64-QAM) in the second layer, and 2 bits ($B_4B_9$, QPSK) in the third layer, with power allocations of $$\left[\frac{256}{341}, \frac{84}{341}, \frac{1}{341}\right],$$

respectively.

Option 3c: Include 6 bits ($B_0B_1B_2B_5B_6B_7$, 64-QAM) in the first layer, 2 bits ($B_3B_8$, QPSK) in the second layer, and 2 bits ($B_4B_9$, QPSK) in third layer, with power allocations of $$\left[\frac{336}{341}, \frac{4}{341}, \frac{1}{341}\right],$$

respectively.

Option 3d: Include 2 bits ($B_0B_5$, QPSK) in the first layer, 4 bits ($B_1B_2B_6B_7$, 16-QAM) in the second layer, and 4 bits ($B_3B_4B_8B_9$, 16-QAM) in the third layer, with power allocations of $$\left[\frac{256}{341}, \frac{80}{341}, \frac{5}{341}\right],$$

respectively.

Option 3e: Include 4 bits ($B_0B_1B_5B_6$, 16-QAM) in the first layer, 2 bits ($B_2B_7$, QPSK) in the second layer, and 4 bits ($B_3B_4B_8B_9$, 16-QAM) in the third layer, with power allocations of $$\left[\frac{320}{341}, \frac{16}{341}, \frac{5}{341}\right],$$

respectively.

Option 3f: Include 4 bits ($B_0B_1B_5B_6$, 16-QAM) in the first layer, 4 bits ($B_2B_3B_7B_8$, 16-QAM) in the second layer, and 2 bits ($B_4B_9$, QPSK) in the third layer, with power allocations of $$\left[\frac{320}{341}, \frac{20}{341}, \frac{1}{341}\right],$$

respectively.

Option 4: Divide the 1024-QAM constellation into two layers.

Option 4a: Include 2 bits ($B_0B_5$, QPSK) in the first layer and 8 bits ($B_1B_2B_3B_4B_6B_7B_8B_9$, 256-QAM) in the second layer, with power allocations of $$\left[\frac{256}{341}, \frac{85}{341}\right],$$

respectively.

Option 4b: Include 8 bits ($B_0B_1B_2B_3B_5B_6B_7B_8$, 256-QAM) in the first layer and 2 bits ($B_4B_9$, QPSK) in the second layer, with power allocations of $$\left[\frac{340}{341}, \frac{1}{341}\right],$$

respectively.

Option 4c: Include 4 bits ($B_0B_1B_5B_6$, 16-QAM) in the first layer and 6 bits ($B_2B_3B_4B_7B_8B_9$, 64-QAM) in the second layer, with power allocations of $$\left[\frac{320}{341}, \frac{21}{341}\right],$$

respectively.

Option 4d: Include 6 bits ($B_0B_1B_2B_5B_6B_7$, 64-QAM) in the first layer and 4 bits ($B_3B_4B_8B_9$, 16-QAM) in the second layer, with power allocations of $$\left[\frac{336}{341}, \frac{5}{341}\right],$$

respectively.

Likewise, there may be several ways to divide a 4096-QAM constellation into multiple layers, including (but not limited to):

Option 1: Divide the 4096-QAM constellation into six 2-bit layers. From the most to least reliable (first to sixth) layers ($B_0B_6/B_1B_7/B_2B_8/B_3B_9/B_4B_{10}/B_5B_{11}$): QPSK signals (centered at a constellation point from previous layer(s), if any) may have power allocations of $$\left[\frac{1024}{1365}, \frac{256}{1365}, \frac{64}{1365}, \frac{16}{1365}, \frac{4}{1365}, \frac{1}{1365}\right],$$

respectively.

Option 2: Divide the 4096-QAM constellation into five layers.

Option 2a: Include 2 bits ($B_0B_6$, QPSK) in the first layer, 2 bits ($B_1B_7$, QPSK) in the second layer, 2 bits ($B_2B_8$, QPSK) in the third layer, 2 bits ($B_3B_9$, QPSK) in the fourth layer, and 4 bits ($B_4B_5B_{10}B_{11}$, 16-QAM) in the fifth layer, with power allocations of $$\left[\frac{1024}{1365}, \frac{256}{1365}, \frac{64}{1365}, \frac{16}{1365}, \frac{5}{1365}\right],$$

respectively.

Option 2b: Include 2 bits ($B_0B_6$, QPSK) in the first layer, 2 bits ($B_1B_7$, QPSK) in the second layer, 2 bits ($B_2B_8$, QPSK) in the third layer, 4 bits ($B_3B_4B_9B_{10}$, 16-QAM) in the fourth layer, and 2 bits ($B_5B_{11}$, QPSK) in the fifth layer, with power allocations of $$\left[\frac{1024}{1365}, \frac{256}{1365}, \frac{64}{1365}, \frac{20}{1365}, \frac{1}{1365}\right],$$

respectively.

Option 2c: Include 2 bits ($B_0B_6$, QPSK) in the first layer, 2 bits ($B_1B_7$, QPSK) in the second layer, 4 bits ($B_2B_3B_8B_9$, 16-QAM) in the third layer, 2 bits ($B_4B_{10}$, QPSK) in the fourth layer, and 2 bits ($B_5B_{11}$, QPSK) in the fifth layer, with power allocations of $$\left[\frac{1024}{1365}, \frac{256}{1365}, \frac{80}{1365}, \frac{4}{1365}, \frac{1}{1365}\right],$$

respectively.

Option 2d: Include 2 bits ($B_0B_6$, QPSK) in the first layer, 4 bits ($B_1B_2B_7B_8$, 16-QAM) in the second layer, 2 bits ($B_3B_9$, QPSK) in the third layer, 2 bits ($B_4B_{10}$, QPSK) in the fourth layer, and 2 bits ($B_5B_{11}$, QPSK) in the fifth layer, with power allocations of $$\left[\frac{1024}{1365}, \frac{320}{1365}, \frac{16}{1365}, \frac{4}{1365}, \frac{1}{1365}\right],$$

respectively.

Option 2e: Include 4 bits ($B_0B_1B_6B_7$, 16-QAM) in the first layer, 2 bits ($B_2B_8$, QPSK) in the second layer, 2 bits ($B_3B_9$, QPSK) in the third layer, 2 bits ($B_4B_{10}$, QPSK) in the fourth layer, and 2 bits ($B_5B_{11}$, QPSK) in the fifth layer, with power allocations of $$\left[\frac{1280}{1365}, \frac{64}{1365}, \frac{16}{1365}, \frac{4}{1365}, \frac{1}{1365}\right],$$

respectively.

Option 3: Divide the 4096-QAM constellation into four layers.

Option 3a: Include 2 bits ($B_0B_6$, QPSK) in first layer, 2 bits ($B_1B_7$, QPSK) in second layer, 2 bits ($B_2B_8$, QPSK) in third layer, 6 bits ($B_3B_4B_5B_9B_{10}B_{11}$, 64-QAM) in fourth layer, with power allocations of $$\left[\frac{1024}{1365}, \frac{256}{1365}, \frac{64}{1365}, \frac{21}{1365}\right]$$

Option 3b: Include 2 bits ($B_0B_6$, QPSK) in the first layer, 2 bits ($B_1B_7$, QPSK) in the second layer, 6 bits ($B_2B_3B_4B_8B_9B_{10}$, 64-QAM) in the third layer, and 2 bits ($B_5B_{11}$, QPSK) in the fourth layer, with power allocations of $$\left[\frac{1024}{1365}, \frac{256}{1365}, \frac{84}{1365}, \frac{1}{1365}\right],$$

respectively.

Option 3c: Include 2 bits ($B_0B_6$, QPSK) in the first layer, 6 bits ($B_1B_2B_3B_7B_8B_9$, 64-QAM) in the second layer, 2 bits ($B_4B_{10}$, QPSK) in the third layer, and 2 bits ($B_5B_{11}$, QPSK) in the fourth layer, with power allocations of $$\left[\frac{1024}{1365}, \frac{336}{1365}, \frac{4}{1365}, \frac{1}{1365}\right],$$

respectively.

Option 3d: Include 6 bits ($B_0B_1B_2B_6B_7B_8$, 64-QAM) in the first layer, 2 bits ($B_3B_9$, QPSK) in the second layer, 2 bits ($B_4B_{10}$, QPSK) in the third layer, and 2 bits ($B_5B_{11}$, QPSK) in the fourth layer, with power allocations of $$\left[\frac{1344}{1365}, \frac{16}{1365}, \frac{4}{1365}, \frac{1}{1365}\right],$$

respectively.

Option 3e: Include 2 bits ($B_0B_6$, QPSK) in the first layer, 2 bits ($B_1B_7$, QPSK) in the second layer, 4 bits ($B_2B_3B_8B_9$, 16-QAM) in the third layer, and 4 bits ($B_4B_5B_{10}B_{11}$, 16-QAM) in the fourth layer, with power allocations of $$\left[\frac{1024}{1365}, \frac{256}{1365}, \frac{80}{1365}, \frac{5}{1365}\right],$$

respectively.

Option 3f: Include 2 bits ($B_0B_6$, QPSK) in the first layer, 4 bits ($B_1B_2B_7B_8$, 16-QAM) in the second layer, 2 bits ($B_3B_9$, QPSK) in the third layer, and 4 bits ($B_4B_5B_{10}B_{11}$, 16-QAM) in the fourth layer, with power allocations of $$\left[\frac{1024}{1365}, \frac{320}{1365}, \frac{16}{1365}, \frac{5}{1365}\right],$$

respectively.

Option 3g: Include 2 bits ($B_0B_6$, QPSK) in the first layer, 4 bits ($B_1B_2B_7B_8$, 16-QAM) in the second layer, 4 bits ($B_3B_4B_9B_{10}$, 16-QAM) in the third layer, and 2 bits ($B_5B_{11}$, QPSK) in the fourth layer, with power allocations of $$\left[\frac{1024}{1365}, \frac{320}{1365}, \frac{20}{1365}, \frac{1}{1365}\right],$$

respectively.

Option 3h: Include 4 bits ($B_0B_1B_6B_7$, 16-QAM) in the first layer, 2 bits ($B_2B_8$, QPSK) in the second layer, 2 bits ($B_3B_9$, QPSK) in the third layer, and 4 bits ($B_4B_5B_{10}B_{11}$, 16-QAM) in the fourth layer, with power allocations of $$\left[\frac{1280}{1365}, \frac{64}{1365}, \frac{16}{1365}, \frac{5}{1365}\right],$$

respectively.

Option 3i: Include 4 bits ($B_0B_1B_6B_7$, 16-QAM) in the first layer, 2 bits ($B_2B_8$, QPSK) in the second layer, 4 bits ($B_3B_4B_9B_{10}$, 16-QAM) in the third layer, and 2 bits ($B_5B_{11}$, QPSK) in the fourth layer, with power allocations of $$\left[\frac{1280}{1365}, \frac{64}{1365}, \frac{20}{1365}, \frac{1}{1365}\right],$$

respectively.

Option 3j: Include 4 bits ($B_0B_1B_6B_7$, 16-QAM) in the first layer, 4 bits ($B_2B_3B_8B_9$, 16-QAM) in the second layer, 2 bits ($B_4B_{10}$, QPSK) in the third layer, and 2 bits ($B_5B_{11}$, QPSK) in the fourth layer, with power allocations of $$\left[\frac{1280}{1365}, \frac{80}{1365}, \frac{4}{1365}, \frac{1}{1365}\right],$$

respectively.

Option 4: Divide the 4096-QAM constellation into three layers.

Option 4a: Include 2 bits ($B_0B_6$, QPSK) in the first layer, 2 bits ($B_1B_7$, QPSK) in the second layer, and 8 bits ($B_2B_3B_4B_5B_8B_9B_{10}B_{11}$, 256-QAM) in the third layer, with power allocations of $$\left[\frac{1024}{1365}, \frac{256}{1365}, \frac{85}{1365}\right],$$

respectively.

Option 4b: Include 2 bits ($B_0B_6$, QPSK) in the first layer, 8 bits ($B_1B_2B_3B_4B_7B_8B_9B_{10}$, 256-QAM) in the second layer, and 2 bits ($B_5B_{11}$, QPSK) in the third layer, with power allocations of $$\left[\frac{1024}{1365}, \frac{340}{1365}, \frac{1}{1365}\right],$$

respectively.

Option 4c: Include 8 bits ($B_0B_1B_2B_3B_6B_7B_8B_9$, 256-QAM) in the first layer, 2 bits ($B_4B_{10}$, QPSK) in the second layer, and 2 bits ($B_5B_{11}$, QPSK) in the third layer, with power allocations of $$\left[\frac{1360}{1365}, \frac{4}{1365}, \frac{1}{1365}\right],$$

respectively.

Option 4d: Include 2 bits ($B_0B_6$, QPSK) in the first layer, 4 bits ($B_1B_2B_7B_8$, 16-QAM) in the second layer, and 6 bits ($B_3B_4B_5B_9B_{10}B_{11}$, 64-QAM) in the third layer, with power allocations of $$\left[\frac{1024}{1365}, \frac{320}{1365}, \frac{21}{1365}\right],$$

respectively.

Option 4e: Include 2 bits ($B_0B_6$, QPSK) in the first layer, 6 bits ($B_1B_2B_3B_7B_8B_9$, 64-QAM) in the second layer, and 4 bits ($B_4B_5B_{10}B_{11}$, 16-QAM) in the third layer, with power allocations of $$\left[\frac{1024}{1365}, \frac{336}{1365}, \frac{5}{1365}\right],$$

respectively.

Option 4f: Include 4 bits ($B_0B_1B_6B_7$, 16-QAM) in the first layer, 2 bits ($B_2B_8$, QPSK) in the second layer, and 6 bits ($B_3B_4B_5B_9B_{10}B_{11}$, 64-QAM) in the third layer, with power allocations of $$\left[\frac{1280}{1365}, \frac{64}{1365}, \frac{21}{1365}\right],$$

respectively.

Option 4g: Include 6 bits ($B_0B_1B_2B_6B_7B_8$, 64-QAM) in the first layer, 2 bits ($B_3B_9$, QPSK) in the second layer, and 4 bits ($B_4B_5B_{10}B_{11}$, 16-QAM) in the third layer, with power allocations of $$\left[\frac{1344}{1365}, \frac{16}{1365}, \frac{5}{1365}\right],$$

respectively.

Option 4h: Include 4 bits ($B_0B_1B_6B_7$, 16-QAM) in the first layer, 6 bits ($B_2B_3B_4B_8B_9B_{10}$, 64-QAM) in the second layer, and 2 bits ($B_5B_{11}$, QPSK) in the third layer, with power allocations of $$\left[\frac{1280}{1365}, \frac{84}{1365}, \frac{1}{1365}\right],$$

respectively.

Option 4i: Include 6 bits ($B_0B_1B_2B_6B_7B_8$, 64-QAM) in the first layer, 4 bits ($B_3B_4B_9B_{10}$, 16-QAM) in the second layer, and 2 bits ($B_5B_{11}$, QPSK) in the third layer, with power allocations of $$\left[\frac{1344}{1365}, \frac{20}{1365}, \frac{1}{1365}\right],$$

respectively.

Option 4j: Include 4 bits ($B_0B_1B_6B_7$, 16-QAM) in the first layer, 4 bits ($B_2B_3B_8B_9$, 16-QAM) in the second layer, and 4 bits ($B_4B_5B_{10}B_{11}$, 16-QAM) in the third layer, with power allocations of $$\left[\frac{1280}{1365}, \frac{80}{1365}, \frac{5}{1365}\right],$$

respectively.

Option 5: Divide the 4096-QAM constellation into two layers.

Option 5a: Include 2 bits ($B_0B_6$, QPSK) in the first layer and 10 bits ($B_1B_2B_3B_4B_5B_7B_8B_9B_{10}B_{11}$, 1024-QAM) in the second layer, with power allocations of $$\left[\frac{1024}{1365}, \frac{341}{1365}\right],$$

respectively.

Option 5b: Include 10 bits ($B_0B_1B_2B_3B_4B_6B_7B_8B_9B_{10}$, 1024-QAM) in the first layer and 2 bits ($B_5B_{11}$, QPSK) in the second layer, with power allocations of $$\left[\frac{1364}{1365}, \frac{1}{1365}\right],$$

respectively.

Option 5c: Include 4 bits ($B_0B_1B_6B_7$, 16-QAM) in the first layer and 8 bits ($B_2B_3B_4B_5B_8B_9B_{10}B_{11}$, 256-QAM) in the second layer, with power allocations of $$\left[\frac{1280}{1365}, \frac{85}{1365}\right],$$

respectively.

Option 5d: Include 8 bits ($B_0B_1B_2B_3B_6B_7B_8B_9$, 64-QAM) in the first layer and 4 bits ($B_4B_5B_{10}B_{11}$, 16-QAM) in the second layer, with power allocations of $$\left[\frac{1360}{1365}, \frac{5}{1365}\right],$$

respectively.

Option 5e: Include 6 bits ($B_0B_1B_2B_6B_7B_8$, 64-QAM) in the first layer and 6 bits ($B_3B_4B_5B_9B_{10}B_{11}$, 64-QAM) in the second layer, with power allocations of $$\left[\frac{1344}{1365}, \frac{21}{1365}\right],$$

respectively.

In accordance with aspects of the present disclosure, an encoding device (such as a STA 104 or an AP 102) may obtain a first set of systematic bits and parity bits by encoding multiple sets of information bits in accordance with a parallel encoding scheme. The encoding device may obtain a second set of systematic bits and parity bits by using some or all of the first set of systematic bits and parity bits to encode a second set of information bits in accordance with a concatenated encoding scheme. The encoding device may map at least the second set of systematic bits and parity bits to different layers of a constellation based on a first priority associated with the first set of systematic bits and parity bits and a second priority associated with the second set of systematic bits and parity bits. Accordingly, the encoding device may transmit a signal associated with the second set of systematic bits and parity bits based on modulating the signal in accordance with the mapping. Upon receiving the modulated signal from the encoding device, a decoding device (such as a STA 104 or an AP 102) may de-map the modulated signal and decode the resulting bits to extract the first set of information bits and the second set of information bits.

Particular aspects of the subject matter described in the context of the WLAN 100 can be implemented to realize one or more of the following potential advantages. The combined encoding and mapping schemes described with reference to FIG. 1 may improve the likelihood of a decoding device (such as a STA 104 or an AP 102) successfully receiving and decoding information from an encoding device (such as a STA 104 or an AP 102). For example, the bit mapping schemes described herein may enable the encoding device to allocate higher priority bits to more reliable layers of a constellation, thereby improving the likelihood of the higher priority bits being successfully received. Moreover, using combined encoding schemes that leverage aspects of parallel coding and concatenated coding may result in lower rate loss, higher signal quality, fewer decoding errors, etc.

Figure 2:
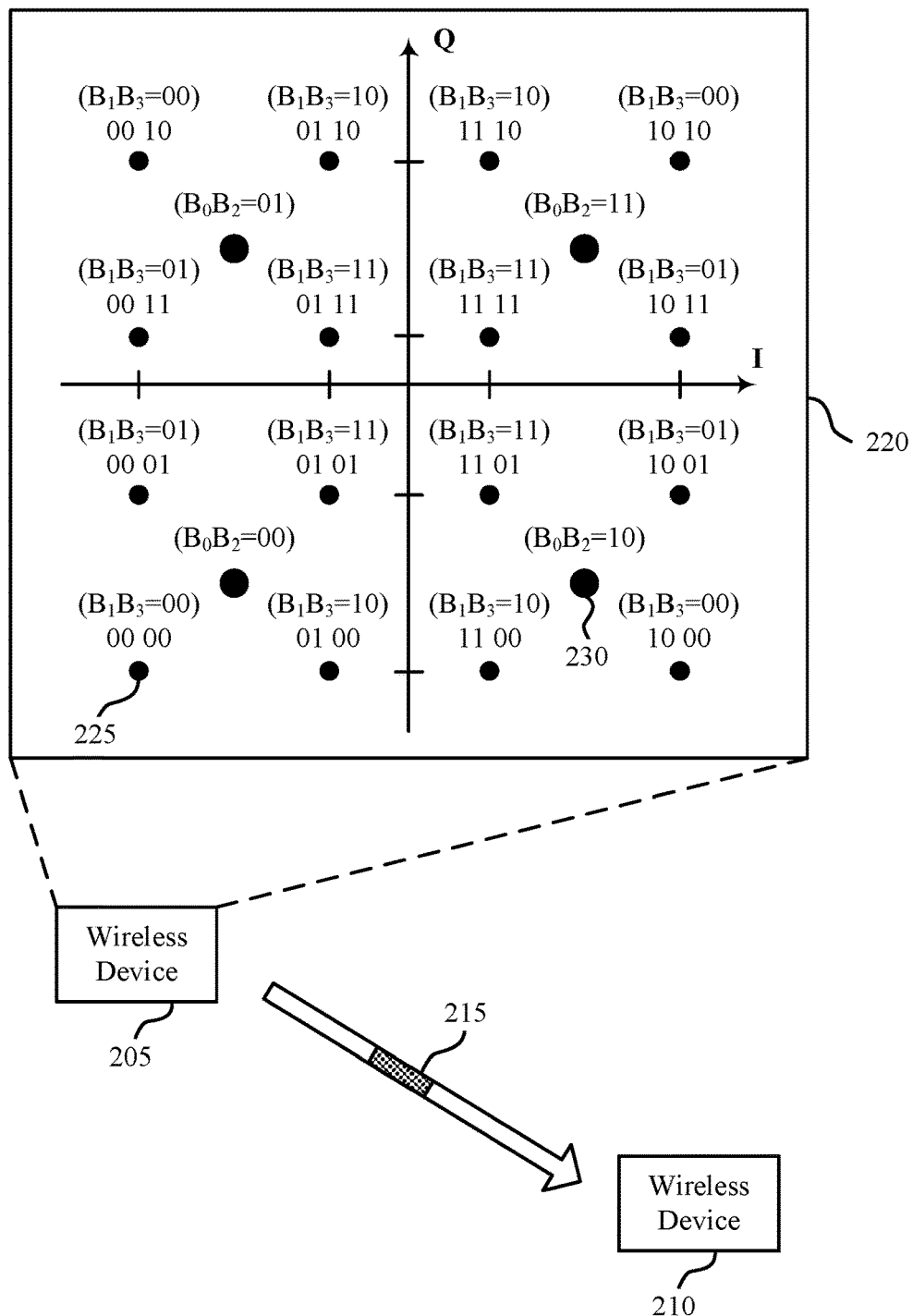
FIG. 2 shows an example signaling diagram that supports enhanced bit mapping and encoding schemes.
Figure 2:
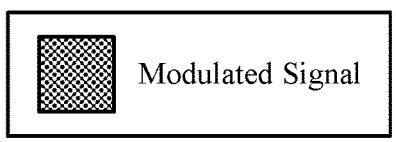

FIG. 2 shows an example signaling diagram 200 that supports enhanced bit mapping and encoding schemes. The signaling diagram 200 includes a wireless device 205 and a wireless device 210. The wireless device 205 may be an example of an AP 102 or a STA 104 and the wireless device 210 may be an example of an AP 102 or a STA 104, as described with reference to FIG. 1. The signaling diagram 200 also includes a modulated signal 215, which may be modulated according to a constellation 220. As illustrated in the signaling diagram 200, the constellation 220 may include different layers, each of which may correspond to a different MCS (for example, QPSK or 16-QAM). Although the constellation 220 is depicted with 2 layers ($B_0B_2$ and $B_1B_3$) in the example of FIG. 2, it is to be understood that the constellation 220 may include any number of layers, each of which may include any number of bit positions.

As described with reference to FIG. 1, some bit positions (also referred to herein as constellation points or QAM bits) in the constellation 220 may be more reliable than others. The BER of bits that are mapped to more reliable bit positions (such as a bit position 230 associated with QPSK) may be lower than the BER of bits that are mapped to less reliable bit positions (such as a bit position 225 associated with 16-QAM). Some MCSs used in Wi-Fi deployments may not leverage different reliabilities of bit positions. Rather, these MCSs map coded bits to the constellation 220 without considering the variations in reliability. Considering the different reliabilities of bit positions in the constellation 220 together with the encoding schemes described with reference to FIGS. 3-6, including the combined encoding schemes illustrated by and described with reference to FIGS. 5 and 6, may facilitate one or more of the following advantages.

The encoding and mapping schemes disclosed herein may enable the wireless device 205 to more reliably transmit bits with higher priority or importance (e.g., information bits in LDPC encoding, or messages, MAC service data units (MSDUs), or layers with higher priority). The described techniques may also facilitate opportunistic use of a wireless medium. For example, when channel conditions are poor, the wireless device 210 (a receiver) may still be able to decode more reliable bit positions, thereby reducing the need for link adaptation. Aspects of the present disclosure may improve the performance of decoding operations at the wireless device 210, for example, by splitting constellation points into layers and using different encoding schemes.

The multi-layer modulation schemes disclosed herein involve splitting QAM bits into different layers associated with different reliabilities. The techniques described herein may be applicable to BPSK, QPSK, 16-QAM, higher-order QAM schemes, and other modulation schemes not explicitly mentioned herein. Aspects of the present disclosure also support different bit mapping approaches, such as gray mapping and independent layer mapping. In terms of encoding schemes, the techniques and mechanisms described herein leverage different encoding schemes that are compatible with the multi-layer structures disclosed herein to provide a balance between coding rate and SNR performance.

The constellation 220 (for example, a 16-QAM constellation) may include two 2-bit layers. Each I/Q component of 16-QAM constellation points may have a value from [−3:2:3]/$\sqrt{10}$. The 16-QAM constellation depicted in FIG. 2 may be divided into two 2-bit layers. The most reliable layer (for example, the first layer, $B_0B_2$) may include QPSK points with a relatively larger power allocation. Each of the $B_0B_2$ constellation points may have a value from $2/\sqrt{10}(\pm 1 \pm j)$, with a power allocation of ⅘. The less reliable layer (for example, the second layer, $B_1B_3$) may centered at a $B_0B_2$ constellation point, and may have a smaller power allocation. Each of the $B_1B_3$ constellation points may have a value from $1/\sqrt{10}(\pm 1 \pm j)$ and a power allocation of ⅕. Between two consecutive 2-bit layers, the power allocation ratio may be 4:1. The power of the modulated signal 215 (for example, a signal modulated using 16-QAM) may be represented by the following equation:

$$x = \frac{2}{\sqrt{5}}x_1 + \frac{1}{\sqrt{5}}x_2,$$

where $x_1$ and $x_2$ are QPSK signals (for example, signals modulated using QPSK).

The techniques described herein may support QAM bit mapping. In some Wi-Fi deployments, QAM schemes may use gray mapping, where adjacent constellation points differ by 1 bit. The mapping of less reliable bits may depend on more reliable bits. For example, in 16-QAM, the bit mapping of $B_1B_3$ constellation points (such as the bit position 225) may depend on $B_0B_2$ constellation points (such as the bit position 230). The techniques described herein may support independent layer bit mapping, where different layers (with different reliabilities) are independently coded. In some examples, higher order QAM schemes may not use gray mapping. Rather, the QAM mapping for each layer (e.g., a QPSK layer $B_0B_2$ or a 16-QAM layer $B_1B_3$) may use gray mapping, thereby removing the dependency of mapping between layers.

Aspects of the subject matter described in the signaling diagram 200 can be implemented to realize one or more of the following potential advantages. The combined encoding and mapping schemes described with reference to FIG. 2 may improve the likelihood of the wireless device 210 successfully receiving and decoding the modulated signal 215 from the wireless device 205. For example, the bit mapping schemes described herein may enable the wireless device 205 to allocate higher priority bits to more reliable layers of the constellation 220, thereby improving the likelihood of the wireless device 210 successfully decoding the higher priority bits. Moreover, using combined encoding schemes that leverage aspects of parallel coding and concatenated coding may result in lower rate loss, higher signal quality, fewer decoding errors, etc.

Figure 3:
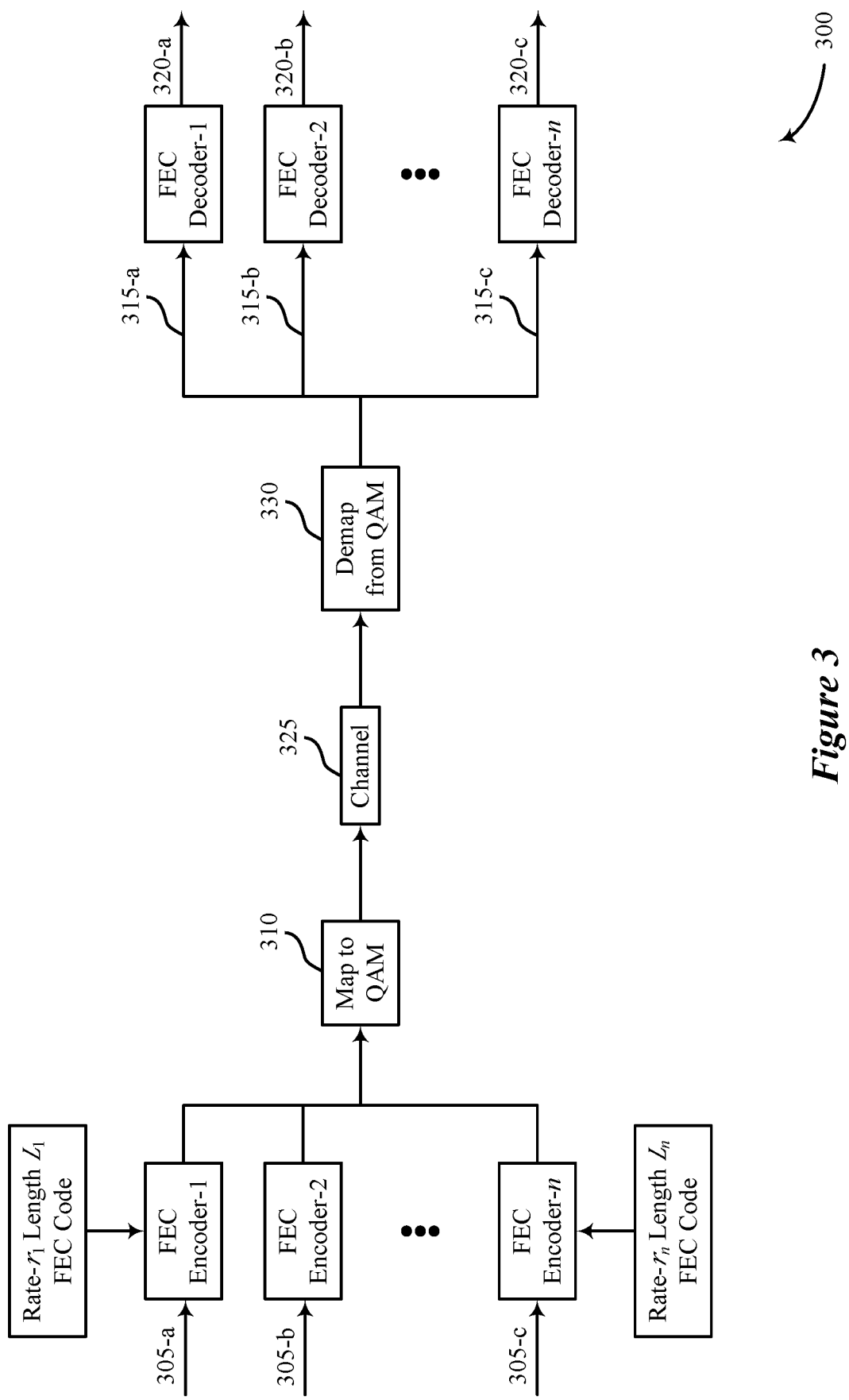
FIGS. 3 through 6 show example coding diagrams that support enhanced bit mapping and encoding schemes.

FIG. 3 illustrates an example of a coding diagram 300 that supports enhanced bit mapping and encoding schemes. The coding diagram 300 may be implemented by a wireless device, such as the wireless device 205 described with reference to FIG. 2, an AP 102 described with reference to FIG. 1, or a STA 104 described with reference to FIG. 1. The coding scheme depicted in FIG. 3 may be an example of a parallel coding scheme in which different bit layers (also referred to as priority groups) are encoded independently and mapped to different layers of QAM bits.

In the example of FIG. 3, an encoding device (such as the wireless device 205 described with reference to FIG. 2) may input a set of information bits 305-$a$ (also referred to as a first priority group or a first bit layer) into a first FEC encoder (FEC encoder-1). Likewise, the encoding device may input a set of information bits 305-$b$ (also referred to as a second priority group or a second bit layer) into a second FEC encoder (FEC encoder-2), and may input a set of information bits 305-$c$ (also referred to as an $n^{th}$ priority group or an $n^{th}$ bit layer) into an $n^{th}$ FEC encoder (FEC encoder-n). The first FEC encoder may be associated with a rate-$r_1$ length $L_1$ FEC code (such as an LDPC code), the second FEC encoder may be associated with a rate-$r_2$ length $L_2$ FEC code, and the $n^{th}$ FEC encoder may be associated with a rate-$r_n$ length $L_n$ FEC code.

The output of the first FEC encoder may include a first set of encoded bits (for example, a combination of systematic bits and parity bits). Likewise, the output of the second FEC encoder may include a second set of encoded bits and the output of the $n^{th}$ FEC encoder may include an $n^{th}$ set of encoded bits. At 310, the encoding device may map the first set of encoded bits to the most reliable QAM positions of a constellation (such as the constellation 220 described with reference to FIG. 2). Likewise, the encoding device may map the second set of encoded bits to the second most reliable QAM positions of the constellation, and may map the $n^{th}$ set of encoded bits to the least reliable QAM positions of the constellation.

Accordingly, the encoding device may modulate and transmit a signal (such as the modulated signal 215 described with reference to FIG. 2) based on the constellation mapping. The modulated signal may pass through a channel 325 (for example, a wireless medium) before being received and de-mapped by a decoding device at 330. The decoding device may de-map the received signal from the corresponding QAM positions of the constellation. The decoding device may extract information bits 320-$a$ (for example, data from the first priority group) by using a first FEC decoder (FEC Decoder-1) to decode an output 315-$a$ from the most reliable QAM positions of the constellation.

Likewise, the decoding device may extract information bits 320-$b$ (for example, data from the second priority group) by using a second FEC encoder (FEC Decoder-2) to decode an output 315-$b$ from the second-most reliable QAM positions of the constellation, and may extract information bits 320-$c$ (for example, data from the $n^{th}$ priority group) by using an $n^{th}$ FEC encoder (FEC Decoder-n) to decode an output 315-$c$ from the least reliable QAM positions of the constellation. For parallel encoding, the code rate of each layer may be the same or different, and the decoding or receiving device may have to decode multiple layers to obtain the encoded data. Each layer may have the original QAM rate (assuming QAM was used to encode the information bits) divided by the total number of layers. The parallel encoding scheme illustrated in the coding diagram 300 may result in lower or no rate loss.

Figure 4:
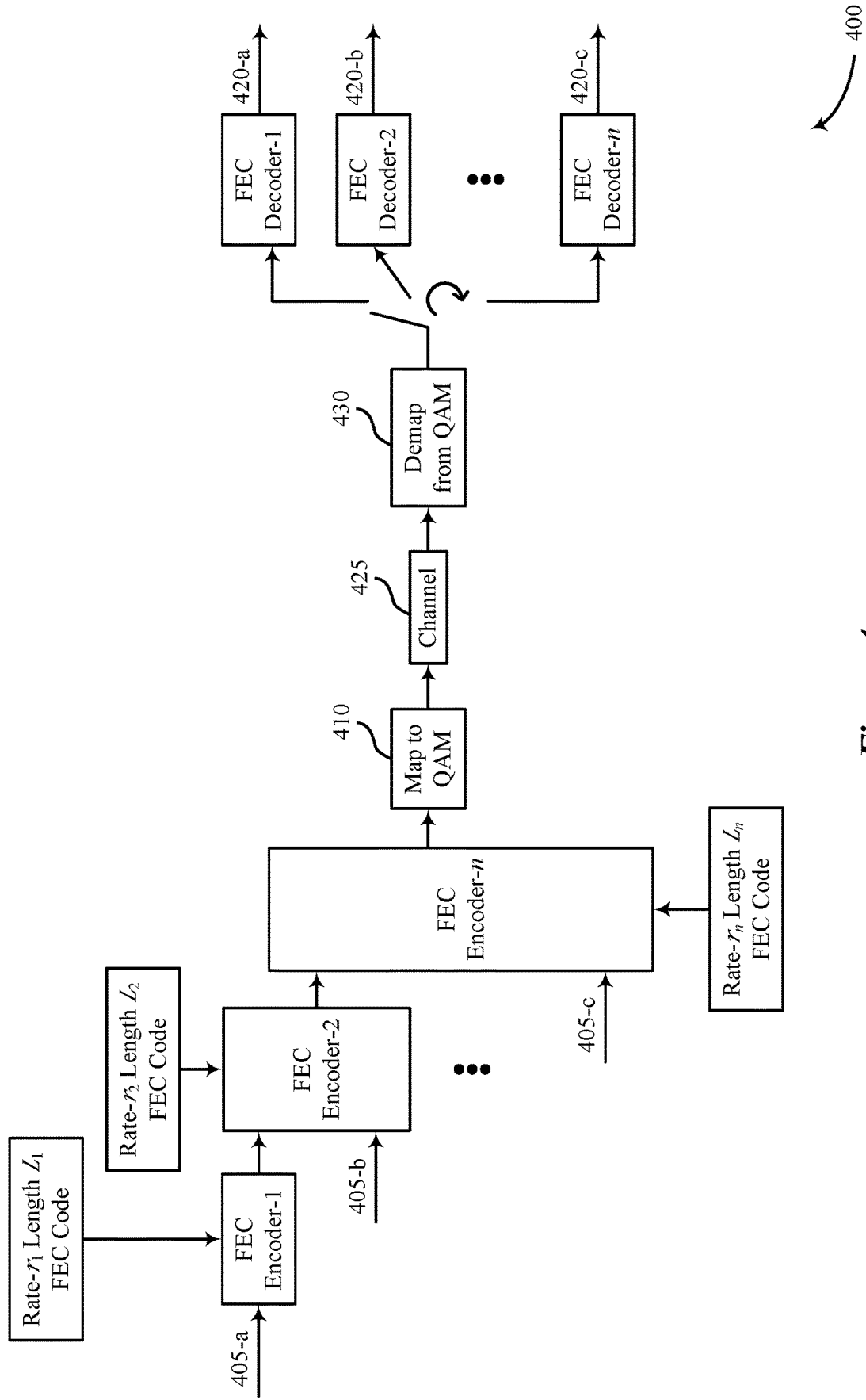

FIG. 4 illustrates an example of a coding diagram 400 that supports enhanced bit mapping and encoding schemes. The coding diagram 400 may be implemented by a wireless device, such as the wireless device 205 described with reference to FIG. 2, an AP 102 described with reference to FIG. 1, or a STA 104 described with reference to FIG. 1. The coding diagram 400 depicted in FIG. 4 may be an example of a concatenated coding scheme in which different bit layers (also referred to as priority groups) depend on one or more preceding bit layers. In other words, the input of an FEC encoder associated with a less reliable bit layer may depend on the output of an FEC encoder from a previous layer and additional information bits.

In the example of FIG. 4, an encoding device (such as the wireless device 205 described with reference to FIG. 2) may input a set of information bits 405-a (also referred to as a first priority group or a first bit layer) into a first FEC encoder (FEC encoder-1). The first FEC encoder may be associated with a rate-$r_1$ length $L_1$ FEC code. Subsequently, the encoding device may input a set of information bits 405-b (also referred to as a second priority group or a second bit layer) and one or more encoded bits from an output of the first FEC encoder (for example, one or more systematic bits and/or parity bits) into a second FEC encoder (FEC encoder-2). The second FEC encoder may be associated with a rate-$r_2$ length $L_2$ FEC code.

Accordingly, the encoding device may input a set of information bits 405-c (also referred to as an $n^{th}$ priority group or an $n^{th}$ bit layer) and one or more encoded bits from an output of the second FEC encoder (for example, one or more systematic bits and/or parity bits) into an $n^{th}$ FEC encoder (FEC encoder-n) associated with a rate-$r_n$ length $L_n$ FEC code. At 410, the encoding device may map encoded bits from an output of the $n^{th}$ FEC encoder to a QAM constellation (such as the constellation 220 described with reference to FIG. 2). For example, coded bits associated with the first priority group may be mapped to the most reliable QAM position, coded bits associated with the second priority group may be mapped to the second most reliable QAM positions, and coded bits associated with the $n^{th}$ priority group may be mapped to the least reliable QAM positions.

Thereafter, the encoding device may modulate and transmit a signal (such as the modulated signal 215 described with reference to FIG. 2) based on the constellation mapping. The modulated signal may pass through a channel 425 (for example, a wireless medium) before being received and de-mapped by a decoding device at 430. The decoding device may de-map the received signal from the corresponding QAM positions of the constellation.

The decoding device may extract information bits 420-a (for example, data from the first priority group) using a first FEC encoder (FEC Decoder-1). Systematic bits of the most reliable coded bits may be used to decode high priority information bits (such as the information bits 420-a). Likewise, the decoding device may extract information bits 420-b (for example, data from the first and second priority groups) using a second FEC encoder (FEC Decoder-2). Similarly, the decoding device may extract information bits 420-c (for example, data from priority groups 1-n) using an $n^{th}$ FEC encoder (FEC Decoder-n). The output of all bits may be used to decode the first through $n^{th}$ priority QAM positions.

Depending on the quality of the channel 425, concatenated encoding schemes may enable a receiver (for example, the decoding device) to selectively decode fewer layers of an FEC code to extract information bits from a given layer (and preceding layers, if any). For concatenated coding, the first layer may be the same as parallel coding, because only first-layer parity bits are used for decoding. The performance and reliability of the least reliable bit layer may be similar to other QAM schemes.

Figure 5:
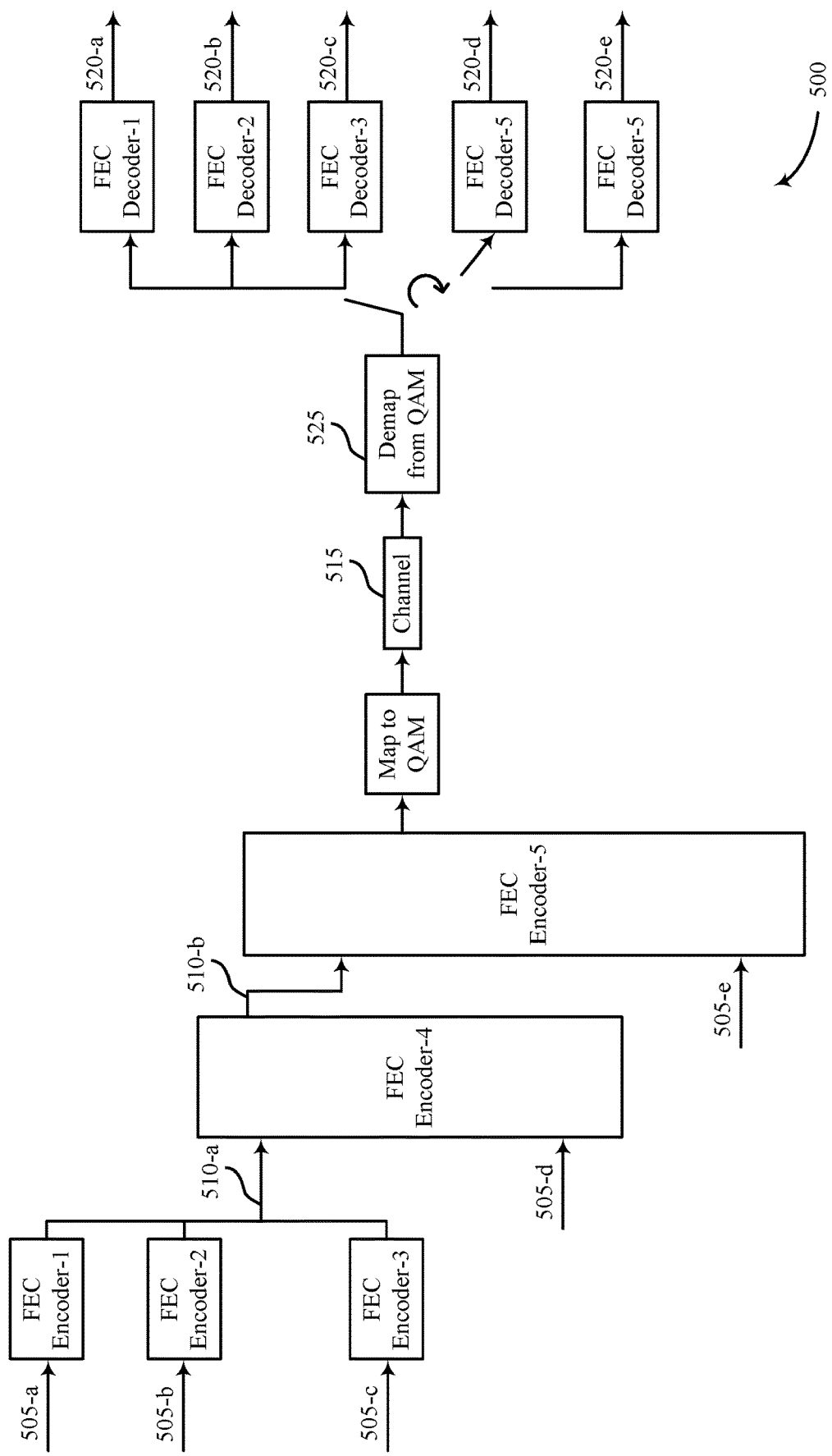

FIG. 5 illustrates an example of a coding diagram 500 that supports enhanced bit mapping and encoding schemes. The coding diagram 500 may be implemented by a wireless device, such as the wireless device 205 described with reference to FIG. 2, an AP 102 described with reference to FIG. 1, or a STA 104 described with reference to FIG. 1. The coding scheme depicted in the example of FIG. 5 may be an example of a combined encoding scheme with cascaded concatenated layers, where parallel coding is used for some bit layers and concatenated coding is used for other layers.

In the example of FIG. 5, an encoding device (such as the wireless device 205 described with reference to FIG. 2) may encode a set of information bits 505-a (also referred to as a first priority group or a first bit layer), a set of information bits 505-b (also referred to as a second priority group or a second bit layer), and a set of information bits 505-c (also referred to as a third priority group or a third bit layer) in accordance with a parallel encoding scheme. The encoding device may encode the set of information bits 505-a using a first FEC encoder (FEC encoder-1). Similarly, the encoding device may encode the set of information bits 505-b using a second FEC encoder (FEC encoder-2), and may encode the set of information bits 505-c using a third FEC encoder (FEC encoder-3).

The output of the first FEC encoder may include a first set of encoded bits (for example, one or more systematic bits and parity bits), the output of the second FEC encoder may include a second set of encoded bits, and the output of the third FEC encoder may include a third set of encoded bits. The encoding device may input a set of information bits 505-d (also referred to as a fourth priority group or a fourth bit layer) and systematic bits 510-a from the first set of encoded bits, the second set of encoded bits, and the third set of encoded bits into a fourth FEC encoder (FEC encoder-4) in accordance with a concatenated encoding scheme. The output of the fourth FEC encoder may include a fourth set of encoded bits.

Accordingly, the encoding device may input a set of information bits 505-e (also referred to as a fifth priority group or a fifth bit layer) and encoded bits 510-b (for example, systematic bits and parity bits) from the fourth set of encoded bits into a fifth FEC encoder (FEC encoder-5) in accordance with a concatenated encoding scheme. The output of the fifth FEC encoder may include a fifth set of encoded bits, which the encoding device may map to one or more layers of a QAM constellation (such as the constellation 220 described with reference to FIG. 2).

Thereafter, the encoding device may modulate and transmit a signal (such as the modulated signal 215 described with reference to FIG. 2) based on the QAM constellation mapping. The modulated signal may pass through a channel 515 (for example, a wireless medium) before being received and de-mapped by a decoding device at 525. The decoding device may de-map the received signal from the corresponding QAM positions of the constellation.

The decoding device may extract information bits 520-a (data from the first priority group) using a first FEC decoder (FEC Decoder-1). Likewise, the decoding device may extract information bits 520-b (data from the second priority group) using a second FEC decoder (FEC Decoder-2), and may extract information bits 520-c (data from the third priority group) using a third FEC decoder (FEC Decoder-3). Since the first three priority groups were encoded using a parallel coding scheme, the information bits 520-a, the information bits 520-b, and the information bits 520-c each include data associated with one priority group.

The decoding device may extract information bits 520-d (data from priority groups 1 through 4) and information bits 520-e (data from priority groups 1 through 5) using a fourth FEC decoder (FEC Decoder-4) and a fifth FEC decoder (FEC Decoder-5), respectively. If the fourth or fifth bit layer (e.g., the fourth or fifth priority group) can be decoded, the decoding device may decode all lower layers preceding the highest decodable layer (as these layers were encoded using a concatenated coding scheme). If the decoding device is unable to decode the fourth bit layer, the decoding device may have to decode the first three bit layers separately.

As illustrated in the example of FIG. 5, combined encoding with cascaded concatenated layers may involve using parallel coding for lower bit layers (for example, priority groups with SNR thresholds below the original QAM) and concatenated coding for higher layers (for example, remaining priority groups). To reduce the rate loss associated with such concatenation, parity bits from previous layer(s) may not be used as information bits for the current layer.

Figure 6:
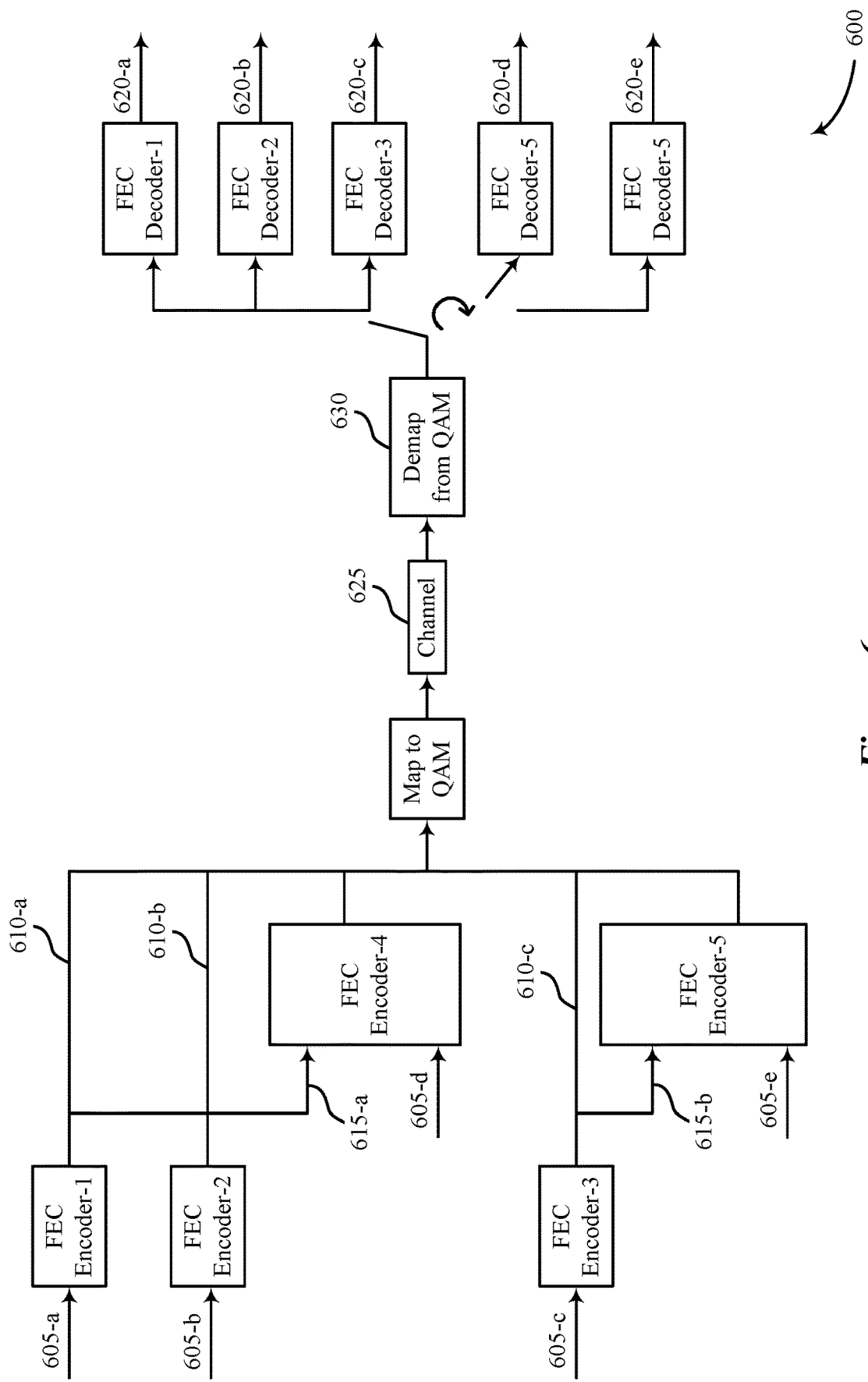

FIG. 6 illustrates an example of a coding diagram 600 that supports enhanced bit mapping and encoding schemes. The coding diagram 600 may be implemented by a wireless device, such as the wireless device 205 described with reference to FIG. 2, an AP 102 described with reference to FIG. 1, or a STA 104 described with reference to FIG. 1. The coding scheme depicted in the example of FIG. 6 may be an example of a combined encoding scheme with non-cascaded concatenated layers, where parallel coding is used for some bit layers and concatenated coding is used for other layers.

In the example of FIG. 6, an encoding device (such as the wireless device 205 described with reference to FIG. 2) may encode a set of information bits 605-a (also referred to as a first priority group or a first bit layer) and a set of information bits 605-b (also referred to as a second priority group or a second bit layer) in accordance with a parallel encoding scheme. The encoding device may encode the set of information bits 505-a using a first FEC encoder (FEC encoder-1), and may encode the set of information bits 605-b using a second FEC encoder (FEC encoder-2).

The output of the first FEC encoder may include a first set of encoded bits (for example, a combination of systematic bits and parity bits), while the output of the second FEC encoder may include a second set of encoded bits. The encoding device may input a set of information bits 605-d (also referred to as a fourth priority group or a fourth bit layer) and systematic bits 615-a from the first set of encoded bits and the second set of encoded bits into a fourth FEC encoder (FEC encoder-4) in accordance with a concatenated encoding scheme.

Similarly, the encoding device may use a third FEC encoder (FEC encoder-3) to encode a set of information bits 605-c (also referred to as a third priority group or a third bit layer). The output of the third FEC encoder may include a third set of encoded bits. The encoding device may input a set of information bits 605-e (also referred to as a fifth priority group or a fifth bit layer) and systematic bits 615-b from the third set of encoded bits into a fifth FEC encoder (FEC encoder-5) in accordance with a concatenated encoding scheme. The output of the fifth FEC encoder may include a fifth set of encoded bits.

Accordingly, the encoding device may map parity bits 610-a from the first set of encoded bits (e.g., the output of the first FEC encoder), parity bits 610-b from the second set of encoder bits (e.g., the output of the second FEC encoder), parity bits 610-c from the third set of encoded bits (e.g., the output of the third FEC encoder), systematic/parity bits from the fourth set of encoded bits (e.g., the output of the fourth FEC encoder), and systematic/parity bits from the fifth set of encoded bits (e.g., the output of the fifth FEC encoder) to different positions of a QAM constellation (such as the constellation 220 described with reference to FIG. 2).

Thereafter, the encoding device may modulate and transmit a signal (such as the modulated signal 215 described with reference to FIG. 2) based on the QAM constellation mapping. The modulated signal may pass through a channel 625 (for example, a wireless medium) before being received and de-mapped by a decoding device at 630. The decoding device may de-map the received signal from the corresponding QAM positions of the constellation.

The decoding device may extract information bits 620-a (data from the first priority group) using a first FEC decoder (FEC Decoder-1). Likewise, the decoding device may extract information bits 620-b (data from the second priority group) using a second FEC decoder (FEC Decoder-2), and may extract information bits 620-c (data from the third priority group) using a third FEC decoder (FEC Decoder-3). Since the first three priority groups were encoded using a parallel coding scheme, the information bits 620-a, the information bits 620-b, and the information bits 620-c each include data associated with one priority group.

The decoding device may extract information bits 620-d (data from priority groups 1, 2, and 4) and information bits 620-e (data from priority groups 3 and 5) using a fourth FEC decoder (FEC Decoder-4) and a fifth FEC decoder (FEC Decoder-5), respectively. If the fourth and fifth bit layer (e.g., the fourth and fifth priority group) can be decoded, the decoding device may decode all lower layers preceding the highest decodable layer (as these layers were encoded using a concatenated coding scheme). For example, if the fourth bit layer can be decoded, the decoding device may be able to extract the first and second layers (since these layers were concatenated with the fourth bit layer). Likewise, if the fifth bit layer can be decoded, the decoding device may be able to extract the third layer (since this layer was concatenated with the fifth bit layer). If the decoding device is unable to decode the fourth bit layer, the decoding device may have to decode the first three bit layers separately.

Using cascaded concatenated layers for 256 or 1024-QAM may result in rate loss. To mitigate this rate loss, non-cascaded concatenated layers can be used instead (as shown in the example of FIG. 6). For each concatenated layer, a subset of previous layers (but not all previous layers) may be used in the concatenation process. To further reduce rate loss, parity bits from previous layer(s) may not be used as information bits for the current layer.

Figure 7:
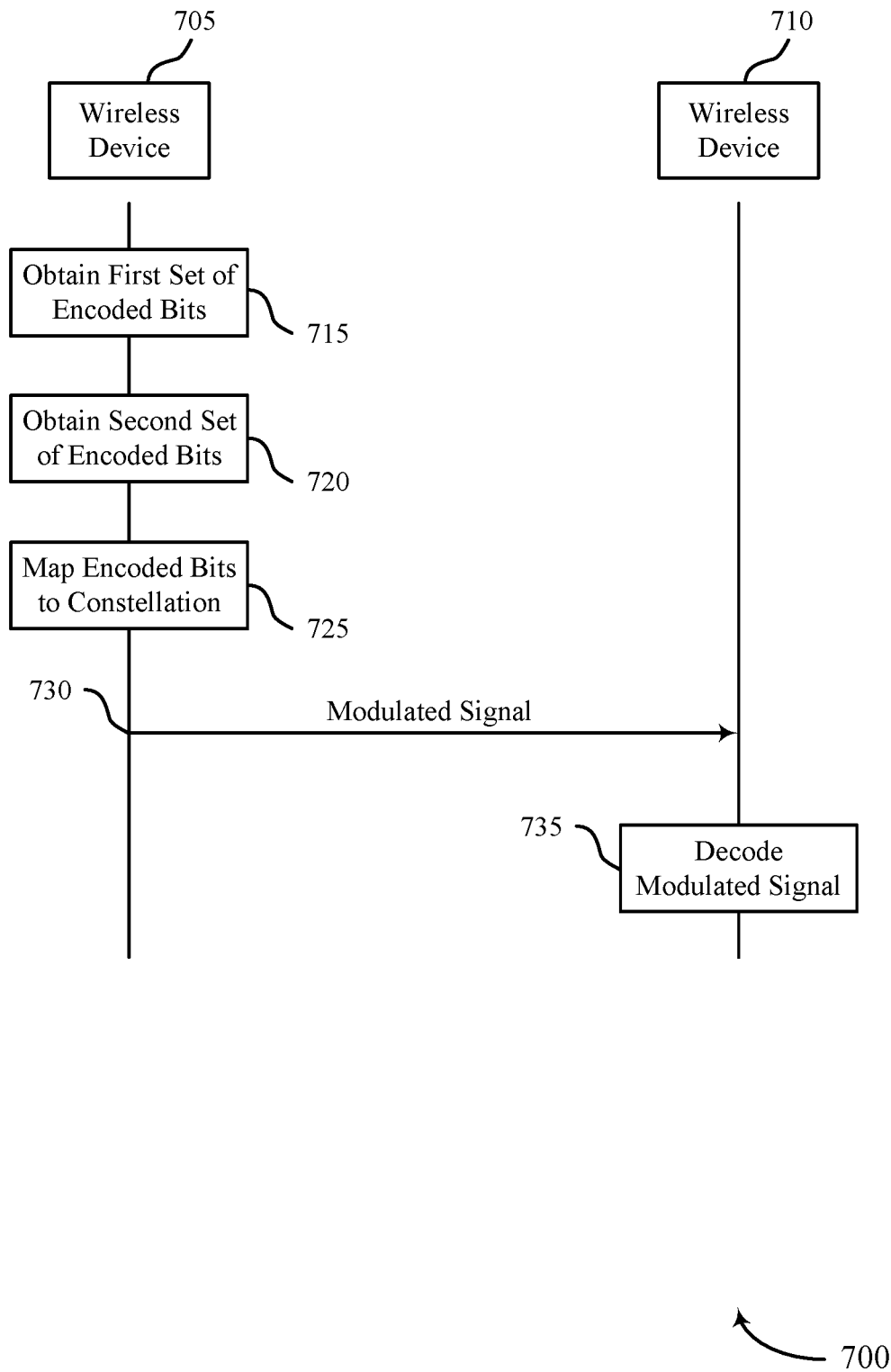
FIG. 7 shows an example process flow that supports enhanced bit mapping and encoding schemes.

FIG. 7 shows an example process flow 700 that supports enhanced bit mapping and encoding schemes. The process flow 700 includes a wireless device 705 (such as an encoding device) and a wireless device 710 (such as a decoding device), each of which may be an example of an AP 102 described with reference to FIG. 1, a STA 104 described with reference to FIG. 1, or the wireless device 205 described with reference to FIG. 2. In the following description of the process flow 700, operations between the wireless device 705 and the wireless device 710 may be added, omitted, or performed in a different order (with respect to the exemplary order shown).

At 715, the wireless device 705 may obtain two or more sets of systematic bits and two or more sets of parity bits based on encoding a first set of information bits in parallel with at least one other set of information bits. Encoding the first set of information bits may yield a first set of systematic bits and a first set of parity bits associated with a first priority. The wireless device 705 may encode the first set of information bits by inputting the first set of information bits to a first FEC encoder. Likewise, the wireless device 705 may encode the at least one other set of information bits by inputting the at least one other set of information bits into at least one other FEC encoder that is different from the first FEC encoder.

At 720, the wireless device 705 may obtain a second set of systematic bits and a second set of parity bits associated with a second priority based on using one or both of the first set of systematic bits and the first set of parity bits to encode a second set of information bits in accordance with a concatenated encoding scheme (such as the concatenated encoding scheme depicted in the example of FIG. 4). For example, the wireless device may input the second set of information bits and one or more bits from the first set of systematic bits and/or the first set of parity bits into a second FEC encoder.

At 725, the wireless device 705 may map at least the second set of systematic bits and the second set of parity bits to layers of a constellation based on the first priority of the first set of information bits and the second priority of the second set of information bits. In some implementations, different sets of bits may be mapped to different layers of the constellation according to a reliability of each layer. Additionally, or alternatively, the wireless device 705 may map encoded bits to layers of the constellation according to a BER threshold associated with a wireless medium between the wireless device 705 and the wireless device 710, an SNR threshold associated with the wireless medium, or both.

At 730, the wireless device 705 may modulate a signal in accordance with the mapping (for example, using the corresponding phase, amplitude, and power allocation values from the constellation), and may transmit the modulated signal to the wireless device 710 via the wireless medium (such as the channel 625 described with reference to FIG. 6). The modulated signal may indicate the first set of systematic bits, the first set of parity bits, the second set of systematic bits, the second set of parity bits, or a combination thereof.

At 735, the wireless device 710 may decode the modulated signal (for example, the modulated signal 215 described with reference to FIG. 2) from the wireless device 705 to obtain the first set of information bits associated with the first priority and the second set of information bits associated with the second priority. In some implementations, the wireless device 710 may decode the modulated signal by de-mapping the modulated signal from the constellation and using different FEC decoders to decode subsets of the bits that result from the de-mapping process.

Aspects of the subject matter described in the process flow 700 can be implemented to realize one or more of the following potential advantages. The combined encoding and mapping schemes described with reference to FIG. 7 may improve the likelihood of the wireless device 710 successfully receiving and decoding information from the wireless device 705. For example, the bit mapping schemes described herein may enable the wireless device 705 to allocate higher priority bits to more reliable layers of a constellation, thereby improving the likelihood of the wireless device 710 successfully decoding the higher priority bits. Moreover, using combined encoding schemes that leverage aspects of parallel coding and concatenated coding may result in lower rate loss, higher signal quality, fewer decoding errors, etc.

Figure 8:
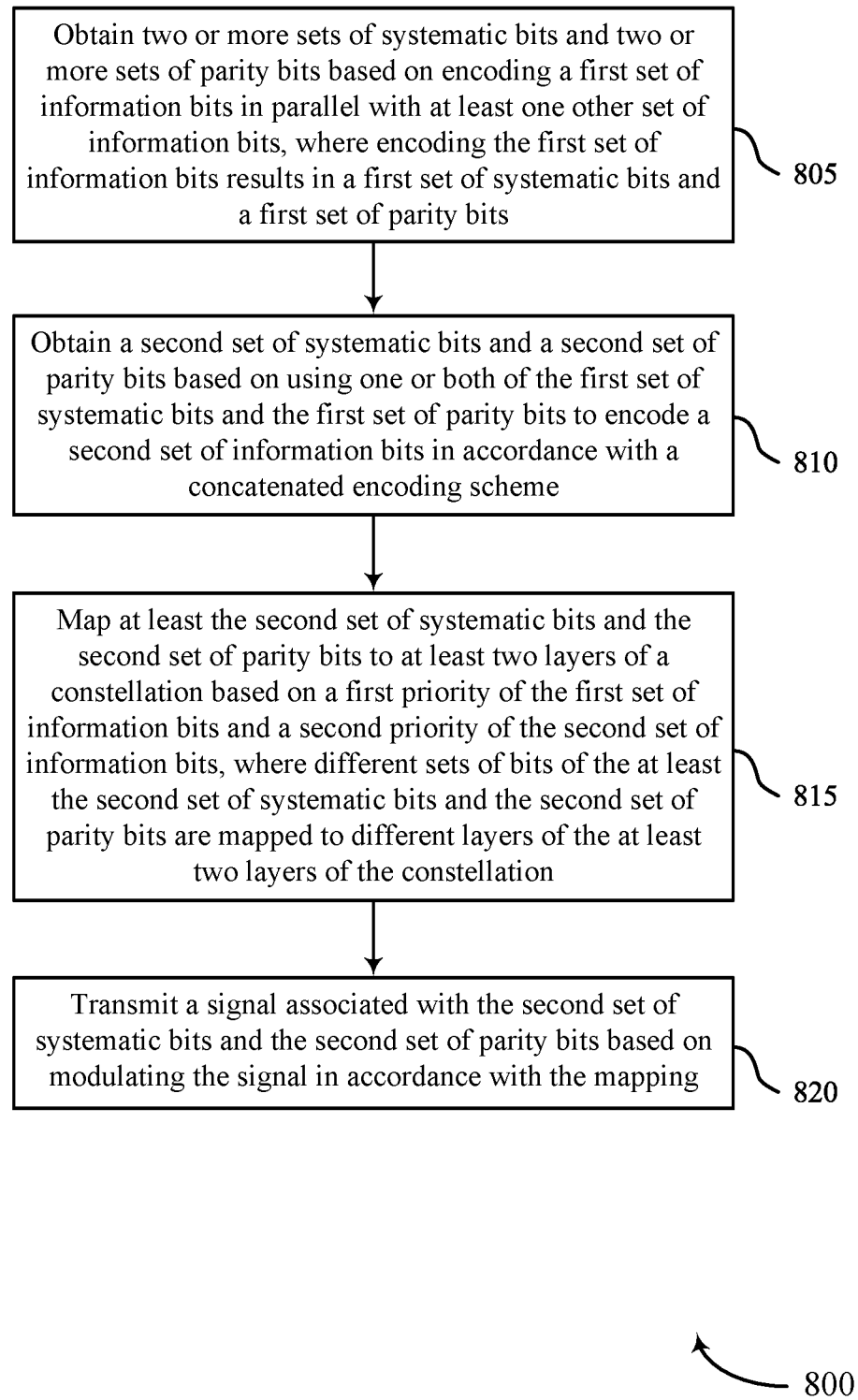
FIGS. 8 and 9 show flowcharts illustrating example processes that support enhanced bit mapping and encoding schemes.

FIG. 8 shows a flowchart illustrating an example process 800 performable by a wireless device that supports enhanced bit mapping and encoding schemes according to some aspects of the present disclosure. The operations of the process 800 may be implemented by a wireless device or components thereof. For example, the process 800 may be performed by the wireless device 205 described with reference to FIG. 2, operating as or within a wireless STA or a wireless AP. In some examples, the process 800 may be performed by a wireless STA (such as one of the STAs 104 described with reference to FIG. 1) or a wireless AP (such as one of the APs 102 described with reference to FIG. 1).

At 805, the wireless device may obtain two or more sets of systematic bits and two or more sets of parity bits based on encoding a first set of information bits in parallel with at least one other set of information bits, where encoding the first set of information bits results in a first set of systematic bits and a first set of parity bits.

At 810, the wireless device may obtain a second set of systematic bits and a second set of parity bits based on using one or both of the first set of systematic bits and the first set of parity bits to encode a second set of information bits in accordance with a concatenated encoding scheme.

At 815, the wireless device may map at least the second set of systematic bits and the second set of parity bits to at least two layers of a constellation based on a first priority of the first set of information bits and a second priority of the second set of information bits, where different sets of bits of the at least the second set of systematic bits and the second set of parity bits are mapped to different layers of the at least two layers of the constellation.

At 820, the wireless device may transmit a signal associated with the second set of systematic bits and the second set of parity bits based on modulating the signal in accordance with the mapping.

Figure 9:
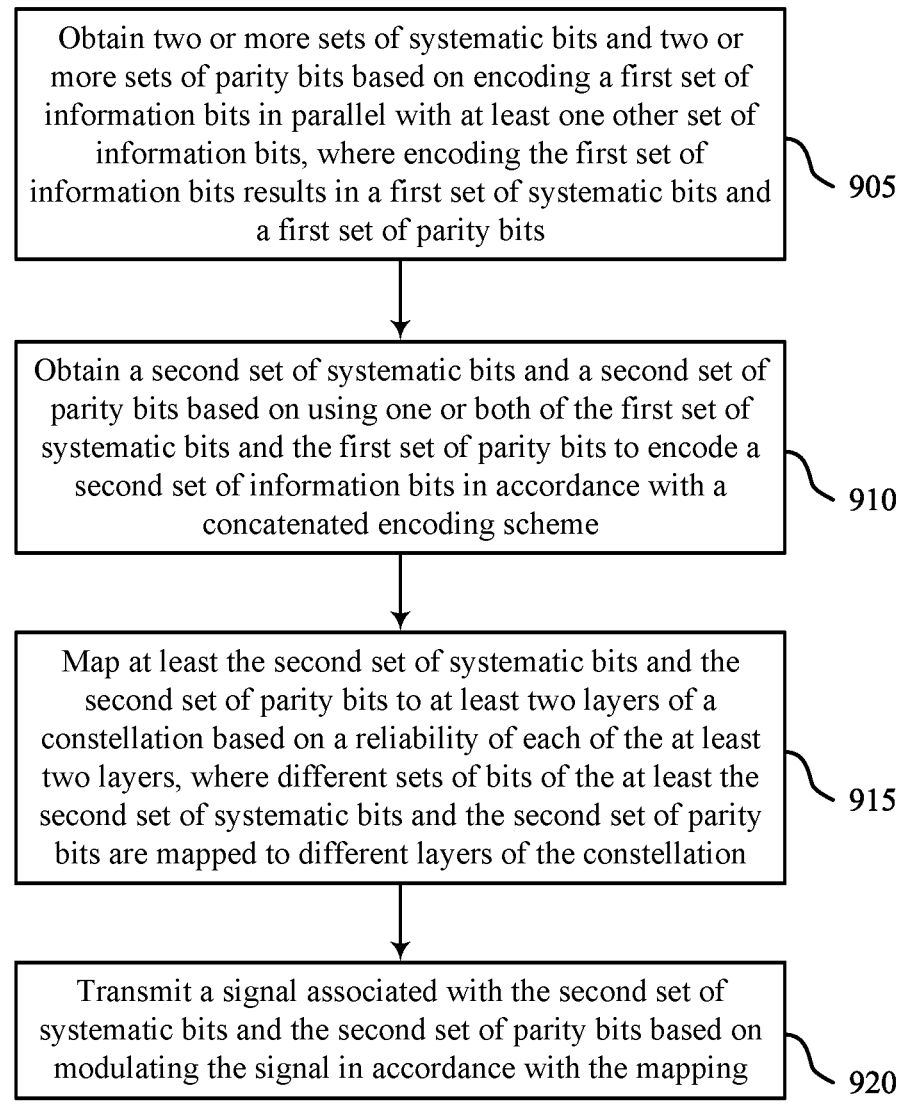

FIG. 9 shows a flowchart illustrating an example process 900 performable at a wireless device that supports enhanced bit mapping and encoding schemes according to some aspects of the present disclosure. The operations of the process 900 may be implemented by a wireless device or components thereof. For example, the process 900 may be performed by the wireless device 205 described with reference to FIG. 2, operating as or within a wireless STA or a wireless AP. In some examples, the process 900 may be performed by one of the STAs 104 or APs 102 described with reference to FIG. 1.

At 905, the wireless device may obtain two or more sets of systematic bits and two or more sets of parity bits based on encoding a first set of information bits in parallel with at least one other set of information bits, where encoding the first set of information bits results in a first set of systematic bits and a first set of parity bits.

At 910, the wireless device may obtain a second set of systematic bits and a second set of parity bits based on using one or both of the first set of systematic bits and the first set of parity bits to encode a second set of information bits in accordance with a concatenated encoding scheme.

At 915, the wireless device may map at least the second set of systematic bits and the second set of parity bits to at least two layers of a constellation based on a reliability of each of the at least two layers, where different sets of bits of the at least the second set of systematic bits and the second set of parity bits are mapped to different layers of the at least two layers of the constellation.

At 920, the wireless device may transmit a signal associated with the second set of systematic bits and the second set of parity bits based on modulating the signal in accordance with the mapping.

Figure 10:
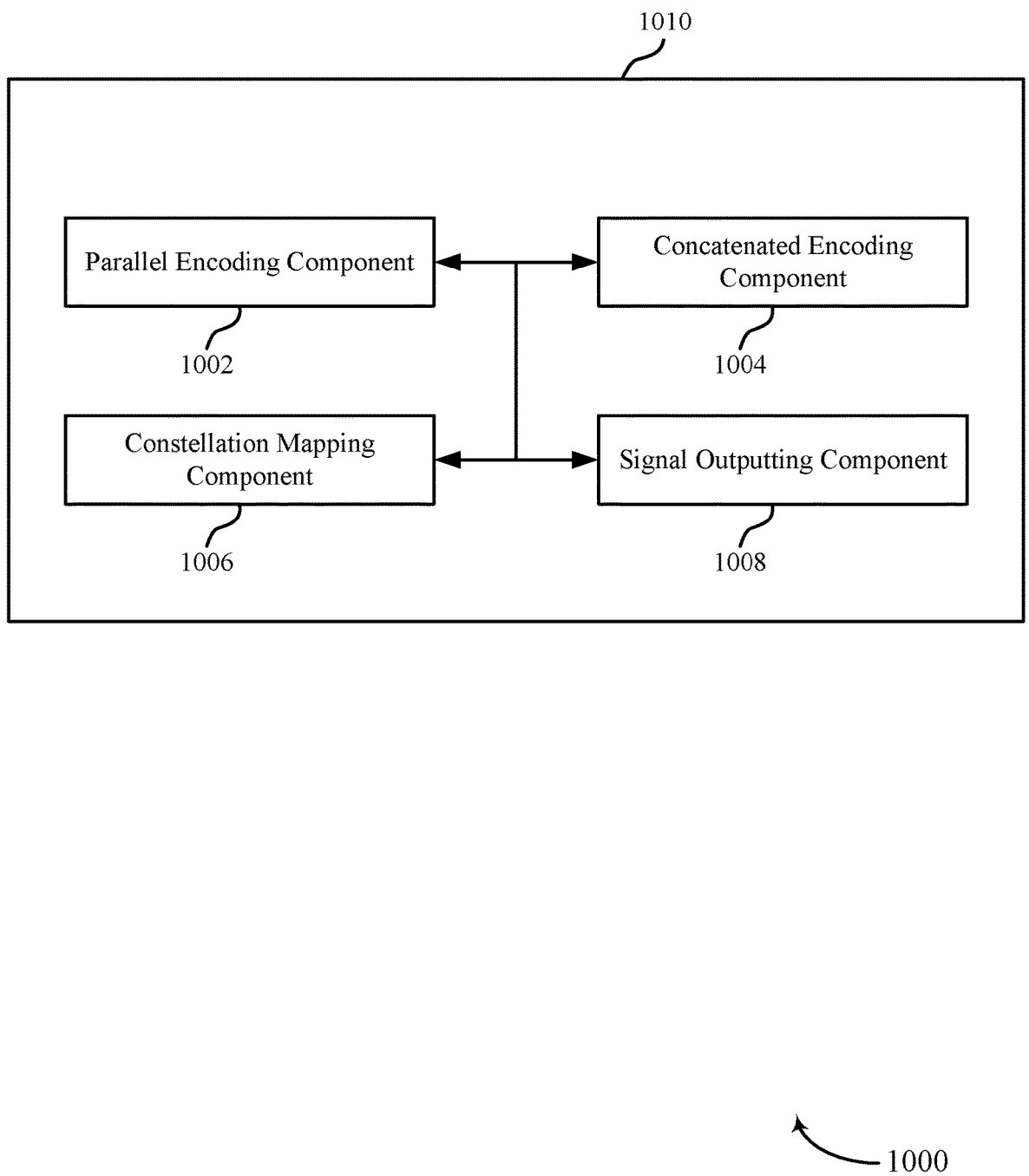
FIG. 10 shows a block diagram of an example wireless communication device that supports enhanced bit mapping and encoding schemes.

FIG. 10 shows a block diagram of an example wireless communication device 1000 that supports enhanced bit mapping and encoding schemes according to some aspects of the present disclosure. In some examples, the wireless communication device 1000 is configured or operable to perform the process 800 described with reference to FIG. 8 or the process 900 described with reference to FIG. 9. In various examples, the wireless communication device 1000 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"): one or more radios (collectively "the radio"); and one or more memories or memory blocks (collectively "the memory").

In some examples, the wireless communication device 1000 can be a device for use in a STA, such as a STA 104 described with reference to FIG. 1. In some other examples, the wireless communication device 1000 can be a STA that includes such a chip, SoC, chipset, package or device as well as multiple antennas. The wireless communication device 1000 is capable of transmitting and receiving wireless communications in the form of wireless packets. For example, the wireless communication device can be configured or operable to transmit and receive packets in the form of physical layer PPDUs and MAC PDUs (MPDUs) conforming to one or more of the IEEE 802.11 family of wireless communication protocol standards.

In some examples, the wireless communication device 1000 also includes or can be coupled with an application processor which may be further coupled with another memory. In some examples, the wireless communication device 1000 further includes a user interface (UI), such as a touchscreen or keypad, and a display, which may be integrated with the UI to form a touchscreen display. In some examples, the wireless communication device 1000 may further include one or more sensors such as, for example, one or more inertial sensors, accelerometers, temperature sensors, pressure sensors, or altitude sensors.

The wireless communication device 1000 includes a parallel encoding component 1002, a concatenated encoding component 1004, a constellation mapping component 1006, and a signal outputting component 1008. Portions of one or more of the components 1002, 1004, 1006, and 1008 may be implemented at least in part in hardware or firmware. For example, the concatenated encoding component 1004 may be implemented at least in part by a modem. In some examples, at least some of the components 1002, 1004, 1006, and 1008 are implemented at least in part by a processor and as software stored in a memory. For example, portions of one or more of the components 1002, 1004, 1006, and 1008 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the wireless communication device 1000). For example, a processing system of the wireless communication device 1000 may refer to a system including the various other components or subcomponents of the wireless communication device 1000, such as a processor, or a transceiver, or a communications manager 1010, or other components or combinations of components of the wireless communication device 1000. The processing system of the wireless communication device 1000 may interface with other components of the wireless communication device 1000, and may process information received from other components (such as inputs or signals) or output information to other components.

For example, a chip or modem of the wireless communication device 1000 may include a processing system, a first interface to output information and a second interface to obtain information. In some implementations, the first interface may refer to an interface between the processing system of the chip or modem and a transmitter, such that the wireless communication device 1000 may transmit information output from the chip or modem. In some implementations, the second interface may refer to an interface between the processing system of the chip or modem and a receiver, such that the wireless communication device 1000 may obtain information or signal inputs, and the information may be passed to the processing system. A person having ordinary skill in the art will readily recognize that the first interface also may obtain information or signal inputs, and the second interface also may output information or signal outputs.

The processing system of the wireless communication device 1000 may interface with other components of the wireless communication device 1000, and may process information received from other components (such as inputs or signals) or output information to other components. For example, a chip or modem of the wireless communication device 1000 may include a processing system, a first interface to output information and a second interface to obtain information. In some implementations, the first interface may refer to an interface between the processing system of the chip or modem and a transmitter, such that the wireless communication device 1000 may transmit information output from the chip or modem. In some implementations, the second interface may refer to an interface between the processing system of the chip or modem and a receiver, such that the wireless communication device 1000 may obtain information or signal inputs, and the information may be passed to the processing system. A person having ordinary skill in the art will readily recognize that the first interface also may obtain information or signal inputs, and the second interface also may output information or signal outputs.

The parallel encoding component 1002 is capable of, configured to, or operable to obtain two or more sets of systematic bits and two or more sets of parity bits based on encoding a first set of information bits in parallel with at least one other set of information bits, where encoding the first set of information bits results in a first set of systematic bits and a first set of parity bits.

The concatenated encoding component 1004 is capable of, configured to, or operable to obtain a second set of systematic bits and a second set of parity bits based on using one or both of the first set of systematic bits and the first set of parity bits to encode a second set of information bits in accordance with a concatenated encoding scheme.

The constellation mapping component 1006 is capable of, configured to, or operable to map at least the second set of systematic bits and the second set of parity bits to at least two layers of a constellation based on a first priority of the first set of information bits and a second priority of the second set of information bits, where different sets of bits of the at least the second set of systematic bits and the second set of parity bits are mapped to different layers of the at least two layers of the constellation.

The signal outputting component 1008 is capable of, configured to, or operable to output a signal associated with the second set of systematic bits and the second set of parity bits based on modulating the signal in accordance with the mapping.

In some implementations, the constellation mapping component 1006 may be capable of, configured to, or operable to map the second set of systematic bits and the second set of parity bits to the at least two layers of the constellation based on a reliability of each of the at least two layers.

In some implementations, the constellation mapping component 1006 may be capable of, configured to, or operable to map the second set of systematic bits and the second set of parity bits to the at least two layers of the constellation based on a BER associated with a wireless communication channel between the wireless device and a second wireless device, an SNR associated with the wireless communication channel between the wireless device and the second wireless device, or both.

In some implementations, the parallel encoding component 1002 may be capable of, configured to, or operable to input two or more sets of information bits to two or more FEC encoders in accordance with a parallel encoding scheme, the two or more sets of information bits including at least the first set of information bits associated with the first priority.

In some implementations, the parallel encoding component 1002 may be capable of, configured to, or operable to obtain two or more outputs from the two or more FEC encoders in accordance with the parallel encoding scheme, each of the two or more outputs including a respective combination of systematic bits and parity bits.

In some implementations, the concatenated encoding component 1004 may be capable of, configured to, or operable to input a third set of information bits and the two or more outputs to a first FEC encoder in accordance with a cascading concatenated encoding scheme, where an output of the first FEC encoder includes a third set of systematic bits and a third set of parity bits.

In some implementations, the concatenated encoding component 1004 may be capable of, configured to, or operable to input the second set of information bits and the output of the first FEC encoder to a second FEC encoder in accordance with the cascading concatenated encoding scheme, where an output of the second FEC encoder includes the second set of systematic bits and the second set of parity bits. In some implementations, the two or more sets of information bits are each associated with a different priority.

In some implementations, the concatenated encoding component 1004 may be capable of, configured to, or operable to input the second set of information bits and one or more systematic bits from a subset of the two or more outputs to a first FEC encoder in accordance with a non-cascading concatenated encoding scheme, where an output of the first FEC encoder includes the second set of systematic bits and the second set of parity bits.

In some implementations, the constellation mapping component 1006 may be capable of, configured to, or operable to map the second set of systematic bits, the second set of parity bits, and one or more parity bits from each of the two or more outputs to the at least two layers of the constellation in accordance with the non-cascading concatenated encoding scheme.

In some implementations, the concatenated encoding component 1004 may be capable of, configured to, or operable to input the first set of information bits to a first FEC encoder in accordance with a non-cascading concatenated encoding scheme, where an output of the first FEC encoder includes the first set of systematic bits and the first set of parity bits.

In some implementations, the concatenated encoding component 1004 may be capable of, configured to, or operable to input the second set of information bits and the first set of systematic bits to a second FEC encoder in accordance with the non-cascading concatenated encoding scheme, where an output of the second FEC encoder includes the second set of systematic bits and the second set of parity bits.

In some implementations, the constellation mapping component 1006 may be capable of, configured to, or operable to map mapping the first set of parity bits, the second set of parity bits, and the second set of systematic bits to the at least two layers of the constellation in accordance with the non-cascading concatenated encoding scheme.

In some implementations, the constellation mapping component 1006 may be capable of, configured to, or operable to map one or more bits associated with the first priority to a first constellation layer associated with a first reliability.

In some implementations, the constellation mapping component 1006 may be capable of, configured to, or operable to map one or more bits associated with the second priority to a second constellation layer associated with a second reliability lower than the first reliability, where the first priority is higher than the second priority.

In some implementations, the constellation mapping component 1006 may be capable of, configured to, or operable to partition the constellation into the at least two layers based on a modulation scheme associated with the signal, where the modulation scheme includes a BPSK modulation scheme, a QPSK modulation scheme, a 16-QAM scheme, a 64-QAM scheme, a 256-QAM scheme, a 1024-QAM scheme, or a 4096-QAM scheme.

In some implementations, the parallel encoding component 1002 may be capable of, configured to, or operable to encode one or more bit layers using a parallel encoding scheme based on an SNR associated with the one or more bit layers satisfying an SNR threshold, the one or more bit layers including at least the first set of information bits.

In some implementations, the concatenated encoding component 1004 may be capable of, configured to, or operable to encode remaining bit layers using the concatenated encoding scheme, the remaining bit layers including at least the second set of information bits.

In some implementations, each layer of the constellation corresponds to two or more coordinates that are each associated with a respective phase value, a respective amplitude value, and a respective power allocation. In some implementations, the first set of systematic bits includes the first set of information bits, and the second set of systematic bits includes the second set of information bits.

In some implementations, different bit layers are independently encoded and mapped to layers of the constellation, each bit layer including one or more information bits associated with a respective priority. In some implementations, each layer of the constellation is associated with a respective coding rate.

Implementation examples are described in the following numbered clauses:

The following provides an overview of clauses of the present disclosure:

Clause 1: A method for wireless communication at a wireless device, comprising: obtaining two or more sets of systematic bits and two or more sets of parity bits based at least in part on encoding a first set of information bits in parallel with at least one other set of information bits, wherein encoding the first set of information bits results in a first set of systematic bits and a first set of parity bits: obtaining a second set of systematic bits and a second set of parity bits based at least in part on using one or both of the first set of systematic bits and the first set of parity bits to encode a second set of information bits in accordance with a concatenated encoding scheme: mapping at least the second set of systematic bits and the second set of parity bits to at least two layers of a constellation based at least in part on a first priority of the first set of information bits and a second priority of the second set of information bits, wherein different sets of bits of the at least the second set of systematic bits and the second set of parity bits are mapped to different layers of the at least two layers of the constellation; and transmitting a signal associated with the second set of systematic bits and the second set of parity bits based at least in part on modulating the signal in accordance with the mapping.

Clause 2: The method of clause 1, wherein mapping to the at least two layers of the constellation comprises: mapping the second set of systematic bits and the second set of parity bits to the at least two layers of the constellation based at least in part on a reliability of each of the at least two layers.

Clause 3: The method of any of clauses 1 or 2, wherein mapping to the at least two layers of the constellation comprises: mapping the second set of systematic bits and the second set of parity bits to the at least two layers of the constellation based at least in part on a BER associated with a wireless communication channel between the wireless device and a second wireless device, an SNR associated with the wireless communication channel between the wireless device and the second wireless device, or both.

Clause 4: The method of any of clauses 1 through 3, further comprising: inputting two or more sets of information bits to two or more FEC encoders in accordance with a parallel encoding scheme, the two or more sets of information bits comprising at least the first set of information bits associated with the first priority: and obtaining two or more outputs from the two or more FEC encoders in accordance with the parallel encoding scheme, each of the two or more outputs comprising a respective combination of systematic bits and parity bits.

Clause 5: The method of clause 4, further comprising: inputting a third set of information bits and the two or more outputs to a first FEC encoder in accordance with a cascading concatenated encoding scheme, wherein an output of the first FEC encoder comprises a third set of systematic bits and a third set of parity bits: and inputting the second set of information bits and the output of the first FEC encoder to a second FEC encoder in accordance with the cascading concatenated encoding scheme, wherein an output of the second FEC encoder comprises the second set of systematic bits and the second set of parity bits.

Clause 6: The method of any of clauses 4 through 5, wherein the two or more sets of information bits are each associated with a different priority.

Clause 7: The method of clause 4, further comprising: inputting the second set of information bits and one or more systematic bits from a subset of the two or more outputs to a first FEC encoder in accordance with a non-cascading concatenated encoding scheme, wherein an output of the first FEC encoder comprises the second set of systematic bits and the second set of parity bits.

Clause 8: The method of clause 7, wherein mapping to the at least two layers of the constellation comprises: mapping the second set of systematic bits, the second set of parity bits, and one or more parity bits from each of the two or more outputs to the at least two layers of the constellation in accordance with the non-cascading concatenated encoding scheme.

Clause 9: The method of any of clauses 1 through 4, further comprising: inputting the first set of information bits to a first FEC encoder in accordance with a non-cascading concatenated encoding scheme, wherein an output of the first FEC encoder comprises the first set of systematic bits and the first set of parity bits: and inputting the second set of information bits and the first set of systematic bits to a second FEC encoder in accordance with the non-cascading concatenated encoding scheme, wherein an output of the second FEC encoder comprises the second set of systematic bits and the second set of parity bits.

Clause 10: The method of clause 9, wherein mapping to the at least two layers of the constellation comprises: mapping the first set of parity bits, the second set of parity bits, and the second set of systematic bits to the at least two layers of the constellation in accordance with the non-cascading concatenated encoding scheme.

Clause 11: The method of any of clauses 1 through 10, wherein mapping to the at least two layers of the constellation comprises: mapping one or more bits associate with the first priority to a first constellation layer associated with a first reliability: and mapping one or more bits associate with the second priority to a second constellation layer associated with a second reliability lower than the first reliability, wherein the first priority is higher than the second priority.

Clause 12: The method of any of clauses 1 through 11, further comprising: partitioning the constellation into the at least two layers based at least in part on an MCS associated with the signal, wherein the MCS comprises a BPSK modulation scheme, a QPSK modulation scheme, a 16-QAM scheme, a 64-QAM scheme, a 256-QAM scheme, a 1024-QAM scheme, or a 4096-QAM scheme.

Clause 13: The method of any of clauses 1 through 12, further comprising: encoding one or more bit layers using a parallel encoding scheme based at least in part on an SNR associated with the one or more bit layers satisfying an SNR threshold, the one or more bit layers comprising at least the first set of information bits; and encoding remaining bit layers using the concatenated encoding scheme, the remaining bit layers comprising at least the second set of information bits.

Clause 14: The method of any of clauses 1 through 13, wherein each layer of the constellation corresponds to two or more coordinates that are each associated with a respective phase value, a respective amplitude value, and a respective power allocation.

Clause 15: The method of any of clauses 1 through 14, wherein the first set of systematic bits comprises the first set of information bits and the second set of systematic bits comprises the second set of information bits.

Clause 16: The method of any of clauses 1 through 15, wherein different bit layers are independently encoded and mapped to layers of the constellation, each bit layer comprising one or more information bits associated with a respective priority.

Clause 17: The method of any of clauses 1 through 16, wherein each layer of the constellation is associated with a respective coding rate.

Clause 18: An apparatus for wireless communication at a wireless device, comprising: a processor: memory coupled with the processor; and instructions stored in the memory and executable by the processor to cause the apparatus to perform a method of any of clauses 1 through 17.

Clause 19: An apparatus for wireless communication at a wireless device, comprising at least one means for performing a method of any of clauses 1 through 17.

Clause 20: A non-transitory computer-readable medium storing code for wireless communication at a wireless device, the code comprising instructions executable by a processor to perform a method of any of clauses 1 through 17.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a wireless device, comprising:
   one or more processors;
   memory coupled with the one or more processors; and
   instructions stored in the memory and executable by the one or more processors to cause the apparatus to:
      obtain two or more sets of systematic bits and two or more sets of parity bits based on encoding a first set of information bits in parallel with at least one other set of information bits, wherein encoding the first set of information bits results in a first set of systematic bits of the two or more sets of systematic bits and a first set of parity bits of the two or more sets of parity bits;
      obtain a second set of systematic bits and a second set of parity bits based on encoding a second set of information bits, in accordance with a concatenated encoding scheme, by using one or both of the first set of systematic bits and the first set of parity bits to encode the second set of information bits;
      map at least the second set of systematic bits and the second set of parity bits to at least two layers of a constellation in accordance with a first priority of the first set of information bits and a second priority of the second set of information bits, wherein different sets of bits of the at least the second set of systematic bits and the second set of parity bits are mapped to different layers of the at least two layers of the constellation; and transmit a signal associated with the second set of systematic bits and the second set of parity bits based at least in part on modulating the signal in accordance with the mapping.

2. The apparatus of claim 1, wherein, to map to the at least two layers of the constellation, the instructions are executable by the one or more processors to cause the apparatus to:
map the second set of systematic bits and the second set of parity bits to the at least two layers of the constellation based at least in part on a reliability of each of the at least two layers.

3. The apparatus of claim 1, wherein, to map to the at least two layers of the constellation, the instructions are executable by the one or more processors to cause the apparatus to:
map the second set of systematic bits and the second set of parity bits to the at least two layers of the constellation based at least in part on a bit error rate (BER) associated with a wireless communication channel between the wireless device and a second wireless device, a signal-to-noise ratio (SNR) associated with the wireless communication channel between the wireless device and the second wireless device, or both.

4. The apparatus of claim 1, wherein the instructions are further executable by the one or more processors to cause the apparatus to:
input two or more sets of information bits to two or more forward error correction (FEC) encoders in accordance with a parallel encoding scheme, the two or more sets of information bits comprising at least the first set of information bits associated with the first priority; and
obtain two or more outputs from the two or more FEC encoders in accordance with the parallel encoding scheme, each of the two or more outputs comprising a respective combination of systematic bits and parity bits.

5. The apparatus of claim 4, wherein the instructions are further executable by the one or more processors to cause the apparatus to:
input a third set of information bits and the two or more outputs to a first FEC encoder in accordance with a cascading concatenated encoding scheme, wherein an output of the first FEC encoder comprises a third set of systematic bits and a third set of parity bits; and
input the second set of information bits and the output of the first FEC encoder to a second FEC encoder in accordance with the cascading concatenated encoding scheme, wherein an output of the second FEC encoder comprises the second set of systematic bits and the second set of parity bits.

6. The apparatus of claim 4, wherein the two or more sets of information bits are each associated with a different priority.

7. The apparatus of claim 4, wherein the instructions are further executable by the one or more processors to cause the apparatus to:
input the second set of information bits and one or more systematic bits from a subset of the two or more outputs to a first FEC encoder in accordance with a non-cascading concatenated encoding scheme, wherein an output of the first FEC encoder comprises the second set of systematic bits and the second set of parity bits.

8. The apparatus of claim 7, wherein, to map to the at least two layers of the constellation, the instructions are executable by the one or more processors to cause the apparatus to:
map the second set of systematic bits, the second set of parity bits, and one or more parity bits from each of the two or more outputs to the at least two layers of the constellation in accordance with the non-cascading concatenated encoding scheme.

9. The apparatus of claim 1, wherein the instructions are further executable by the one or more processors to cause the apparatus to:
input the first set of information bits to a first forward error correction (FEC) encoder in accordance with a non-cascading concatenated encoding scheme, wherein an output of the first FEC encoder comprises the first set of systematic bits and the first set of parity bits; and
input the second set of information bits and the first set of systematic bits to a second FEC encoder in accordance with the non-cascading concatenated encoding scheme, wherein an output of the second FEC encoder comprises the second set of systematic bits and the second set of parity bits.

10. The apparatus of claim 9, wherein, to map to the at least two layers of the constellation, the instructions are executable by the one or more processors to cause the apparatus to:
map the first set of parity bits, the second set of parity bits, and the second set of systematic bits to the at least two layers of the constellation in accordance with the non-cascading concatenated encoding scheme.

11. The apparatus of claim 1, wherein, to map to the at least two layers of the constellation, the instructions are executable by the one or more processors to cause the apparatus to:
map one or more bits associate with the first priority to a first constellation layer associated with a first reliability; and
map one or more bits associate with the second priority to a second constellation layer associated with a second reliability lower than the first reliability, wherein the first priority is higher than the second priority.

12. The apparatus of claim 1, wherein the instructions are further executable by the one or more processors to cause the apparatus to:
partition the constellation into the at least two layers based at least in part on a modulation and coding scheme (MCS) associated with the signal, wherein the MCS comprises a binary phase shift keying (BPSK) modulation scheme, a quadrature phase shift keying (QPSK) modulation scheme, a 16-quadrature amplitude modulation (QAM) scheme, a 64-QAM scheme, a 256-QAM scheme, a 1024-QAM scheme, or a 4096-QAM scheme.

13. The apparatus of claim 1, wherein the instructions are further executable by the one or more processors to cause the apparatus to:
encode one or more bit layers using a parallel encoding scheme based at least in part on a signal-to-noise ratio (SNR) associated with the one or more bit layers satisfying an SNR threshold, the one or more bit layers comprising at least the first set of information bits; and
encode remaining bit layers using the concatenated encoding scheme, the remaining bit layers comprising at least the second set of information bits.

14. The apparatus of claim 1, wherein each layer of the constellation corresponds to two or more coordinates that are each associated with a respective phase value, a respective amplitude value, and a respective power allocation.

15. The apparatus of claim 1, wherein the first set of systematic bits comprises the first set of information bits and the second set of systematic bits comprises the second set of information bits.

16. The apparatus of claim 1, wherein different bit layers are independently encoded and mapped to layers of the constellation, each bit layer comprising one or more information bits associated with a respective priority.

17. The apparatus of claim 1, wherein each layer of the constellation is associated with a respective coding rate.

18. A method for wireless communication at a wireless device, comprising:
obtaining two or more sets of systematic bits and two or more sets of parity bits based on encoding a first set of information bits in parallel with at least one other set of information bits, wherein encoding the first set of information bits results in a first set of systematic bits of the two or more sets of systematic bits and a first set of parity bits of the two or more sets of parity bits;
obtaining a second set of systematic bits and a second set of parity bits based on encoding a second set of information bits, in accordance with a concatenated encoding scheme, by using one or both of the first set of systematic bits and the first set of parity bits to encode the second set of information bits;
mapping at least the second set of systematic bits and the second set of parity bits to at least two layers of a constellation in accordance with a first priority of the first set of information bits and a second priority of the second set of information bits, wherein different sets of bits of the at least the second set of systematic bits and the second set of parity bits are mapped to different layers of the at least two layers of the constellation; and
transmitting a signal associated with the second set of systematic bits and the second set of parity bits based at least in part on modulating the signal in accordance with the mapping.

19. The method of claim 18, wherein the mapping comprises:
mapping the second set of systematic bits and the second set of parity bits to the at least two layers of the constellation based at least in part on a reliability of each of the at least two layers.

20. The method of claim 18, wherein the mapping comprises:
mapping the second set of systematic bits and the second set of parity bits to the at least two layers of the constellation based at least in part on a bit error rate (BER) associated with a wireless communication channel between the wireless device and a second wireless device, a signal-to-noise ratio (SNR) associated with the wireless communication channel between the wireless device and the second wireless device, or both.

21. The method of claim 18, further comprising:
inputting two or more sets of information bits to two or more forward error correction (FEC) encoders in accordance with a parallel encoding scheme, the two or more sets of information bits comprising at least the first set of information bits associated with the first priority; and
obtaining two or more outputs from the two or more FEC encoders in accordance with the parallel encoding scheme, each of the two or more outputs comprising a respective combination of systematic bits and parity bits.

22. The method of claim 21, further comprising:
inputting a third set of information bits and the two or more outputs to a first FEC encoder in accordance with a cascading concatenated encoding scheme, wherein an output of the first FEC encoder comprises a third set of systematic bits and a third set of parity bits; and
inputting the second set of information bits and the output of the first FEC encoder to a second FEC encoder in accordance with the cascading concatenated encoding scheme, wherein an output of the second FEC encoder comprises the second set of systematic bits and the second set of parity bits.

23. The method of claim 21, wherein the two or more sets of information bits are each associated with a different priority.

24. The method of claim 21, further comprising:
inputting the second set of information bits and one or more systematic bits from a subset of the two or more outputs to a first FEC encoder in accordance with a non-cascading concatenated encoding scheme, wherein an output of the first FEC encoder comprises the second set of systematic bits and the second set of parity bits.

25. The method of claim 24, wherein the mapping comprises:
mapping the second set of systematic bits, the second set of parity bits, and one or more parity bits from each of the two or more outputs to the at least two layers of the constellation in accordance with the non-cascading concatenated encoding scheme.

26. The method of claim 18, further comprising:
inputting the first set of information bits to a first forward error correction (FEC) encoder in accordance with a non-cascading concatenated encoding scheme, wherein an output of the first FEC encoder comprises the first set of systematic bits and the first set of parity bits; and
inputting the second set of information bits and the first set of systematic bits to a second FEC encoder in accordance with the non-cascading concatenated encoding scheme, wherein an output of the second FEC encoder comprises the second set of systematic bits and the second set of parity bits.

27. The method of claim 26, wherein the mapping comprises:
mapping the first set of parity bits, the second set of parity bits, and the second set of systematic bits to the at least two layers of the constellation in accordance with the non-cascading concatenated encoding scheme.

28. The method of claim 18, wherein the mapping comprises:
mapping one or more bits associated with the first priority to a first constellation layer associated with a first reliability; and
mapping one or more bits associated with the second priority to a second constellation layer associated with a second reliability lower than the first reliability, wherein the first priority is higher than the second priority.

29. An apparatus for wireless communication at a wireless device, comprising:
means for obtaining two or more sets of systematic bits and two or more sets of parity bits based on encoding a first set of information bits in parallel with at least one other set of information bits, wherein encoding the first set of information bits results in a first set of systematic bits of the two or more sets of systematic bits and a first set of parity bits of the two or more sets of parity bits;
means for obtaining a second set of systematic bits and a second set of parity bits based on encoding a second set of information bits, in accordance with a concatenated encoding scheme, by using one or both of the first set of systematic bits and the first set of parity bits to encode the second set of information bits;

means for mapping at least the second set of systematic bits and the second set of parity bits to at least two layers of a constellation in accordance with a first priority of the first set of information bits and a second priority of the second set of information bits, wherein different sets of bits of the at least the second set of systematic bits and the second set of parity bits are mapped to different layers of the at least two layers of the constellation; and means for transmitting a signal associated with the second set of systematic bits and the second set of parity bits based at least in part on modulating the signal in accordance with the mapping.

30. A non-transitory computer-readable medium storing code for wireless communication at a wireless device, the code comprising instructions executable by one or more processors to:

obtain two or more sets of systematic bits and two or more sets of parity bits based on encoding a first set of information bits in parallel with at least one other set of information bits, wherein encoding the first set of information bits results in a first set of systematic bits of the two or more sets of systematic bits and a first set of parity bits of the two or more sets of parity bits;

obtain a second set of systematic bits and a second set of parity bits based on encoding a second set of information bits, in accordance with a concatenated encoding scheme, by using one or both of the first set of systematic bits and the first set of parity bits to encode the second set of information bits;

mapping at least the second set of systematic bits and the second set of parity bits to at least two layers of a constellation in accordance with a first priority of the first set of information bits and a second priority of the second set of information bits, wherein different sets of bits of the at least the second set of systematic bits and the second set of parity bits are mapped to different layers of the at least two layers of the constellation; and transmit a signal associated with the second set of systematic bits and the second set of parity bits based at least in part on modulating the signal in accordance with the mapping.

* * * * *